(12) United States Patent
Gschwind et al.

(10) Patent No.: US 7,849,294 B2
(45) Date of Patent: Dec. 7, 2010

(54) SHARING DATA IN INTERNAL AND MEMORY REPRESENTATIONS WITH DYNAMIC DATA-DRIVEN CONVERSION

(75) Inventors: Michael K. Gschwind, Chappaqua, NY (US); Brett Olsson, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 12/023,768

(22) Filed: Jan. 31, 2008

(65) Prior Publication Data

US 2009/0198977 A1  Aug. 6, 2009

(51) Int. Cl.
G06F 9/302 (2006.01)
G06F 9/305 (2006.01)

(52) U.S. Cl. ....................... 712/221; 712/222

(58) Field of Classification Search .............. 712/2–6, 712/221, 222
See application file for complete search history.

(56) References Cited

U.S. PATENT DOCUMENTS

| | | | |
|---|---|---|---|
| 4,595,911 A | 6/1986 | Kregness et al. | |
| 5,063,497 A | 11/1991 | Cutler et al. | |
| 5,278,945 A | 1/1994 | Basehore et al. | |
| 5,341,320 A * | 8/1994 | Trissel et al. | 708/498 |
| 5,390,307 A | 2/1995 | Yoshida | |
| 5,450,607 A | 9/1995 | Kowalczyk et al. | |
| 5,487,022 A | 1/1996 | Simpson et al. | |
| 5,560,035 A | 9/1996 | Garg et al. | |
| 5,668,984 A | 9/1997 | Taborn et al. | |
| 5,669,013 A * | 9/1997 | Watanabe et al. | 710/5 |
| 5,675,777 A | 10/1997 | Glickman | |
| 5,685,009 A | 11/1997 | Blomgren et al. | |
| 5,701,508 A | 12/1997 | Glew et al. | |
| 5,751,987 A | 5/1998 | Mahant-Shetti et al. | |
| 5,761,103 A | 6/1998 | Oakland et al. | |
| 5,768,169 A | 6/1998 | Sharangpani | |
| 5,805,475 A | 9/1998 | Putrino et al. | |
| 5,822,778 A | 10/1998 | Dutton et al. | |
| 5,825,678 A | 10/1998 | Smith | |
| 5,978,901 A | 11/1999 | Luedtke et al. | |
| 5,995,122 A | 11/1999 | Hsieh et al. | |
| 6,009,511 A | 12/1999 | Lynch et al. | |
| 6,105,129 A | 8/2000 | Meier et al. | |

(Continued)

OTHER PUBLICATIONS

U.S. Appl. No. 12/023,720, filed Jan. 31, 2008, Gschwind et al.

(Continued)

Primary Examiner—Daniel Pan
(74) Attorney, Agent, or Firm—Stephen J. Walder, Jr.; Kenneth R. Corsello

(57) ABSTRACT

Illustrative embodiments determine the data type of the operand being accessed as well as analyze the data value subrange of the input operand data type. If the operand's data type does not match the required format of the instruction being processed, a determination is made as to whether a subrange of data values of the data type of the input operand is supported natively. If the subrange of data values of the input operand is not supported natively, then a format conversion is performed on the data and the instruction may then operate on the data. Otherwise, the data may be operated on directly by the instruction without a format conversion operation and thus, the conversion is not performed.

24 Claims, 17 Drawing Sheets

U.S. PATENT DOCUMENTS

| | | | |
|---|---|---|---|
| 6,131,104 | A | 10/2000 | Oberman |
| 6,178,482 | B1 | 1/2001 | Sollars |
| 6,185,671 | B1 | 2/2001 | Pentovski et al. |
| 6,282,554 | B1 | 8/2001 | Abdallah et al. |
| 6,292,815 | B1 | 9/2001 | Abdallah et al. |
| 6,295,599 | B1 | 9/2001 | Hansen et al. |
| 6,321,327 | B1 | 11/2001 | Makineni et al. |
| 6,460,135 | B1 | 10/2002 | Suganuma |
| 6,715,061 | B1 | 3/2004 | Wang |
| 6,792,523 | B1 | 9/2004 | Glew et al. |
| 6,839,828 | B2 | 1/2005 | Gschwind et al. |
| 6,934,830 | B2 | 8/2005 | Kadambi et al. |
| 7,043,627 | B2 | 5/2006 | Shimizu et al. |
| 7,149,882 | B2 | 12/2006 | Glew et al. |
| 7,257,695 | B2 | 8/2007 | Jiang et al. |
| 7,430,656 | B2 * | 9/2008 | Sperber et al. .............. 712/221 |
| 2005/0125630 | A1 | 6/2005 | Liao et al. |
| 2005/0289299 | A1 | 12/2005 | Nunamaker et al. |

OTHER PUBLICATIONS

USPTO U.S. Appl. No. 12/023,720, Image File Wrapper printed from PAIR on Jun. 11, 2010, 1 page.

Final Office Action mailed Aug. 5, 2010 for U.S. Appl. No. 121023,720; 10 pages.

Response to Final Office Action filed Sep. 7, 2010 for U.S. Appl. No. 12/023,720; 15 pages.

Response to Office Action filed with the USPTO on Jun. 11, 2010 for U.S. Appl. No. 12/023,720, 16 pages.

* cited by examiner

FIG. 9C-1

| NUMBER | SCIENTIFIC NOTATION DECIMAL | MEMORY FORMAT BINARY SIGN$_1$ EXPONENT$_8$ MANTISSA 23 |
|---|---|---|
| POSITIVE ZERO | 0 | 0 00000000 00000000000000000000000 |
| SMALLEST DENORMALIZED | $2^{-149}$ | 0 00000000 00000000000000000000001 |
| LARGEST DENORMALIZED | $2^{-126} - 2^{-149}$ | 0 00000000 11111111111111111111111 |
| SMALLEST NORMALIZED | $2^{-126}$ | 0 00000001 00000000000000000000000 |
| POSITIVE ONE | 1 | 0 01111111 00000000000000000000000 |
| LARGEST NORMALIZED | $2^{+128} - 2^{+104}$ | 0 11111110 11111111111111111111111 |
| POSITIVE INFINITY | ∞ | 0 11111111 00000000000000000000000 |
| POSITIVE NaN | NaNS | 0 11111111 00000000000000000000001 |

| INTERNAL REGISTER FILE FORMAT BINARY |
|---|
| SIGN$_1$ UNUSED$_1$ EXPONENT$_{11}$ IMPLIED$_1$ MANTISSA$_{52}$ PARITY$_8$ |
| 0 0 01110000001 0 0000000000000000000000000000000000000000000000000000 xxxxxxxx |
| 0 0 01110000001 0 0000000000000000000000000000000000000000000000000001 xxxxxxxx |
| 0 0 01110000001 0 1111111111111111111111111111111111111111111111111110 xxxxxxxx |
| 0 0 01110000001 1 0000000000000000000000000000000000000000000000000000 xxxxxxxx |
| 0 0 01111111111 1 0000000000000000000000000000000000000000000000000000 xxxxxxxx |
| 0 0 10001111110 1 1111111111111111111111111111111111111111111111111110 xxxxxxxx |
| 0 0 11111111111 1 0000000000000000000000000000000000000000000000000000 xxxxxxxx |
| 0 0 11111111111 1 0000000000000000000000000000000000000000000000000001 xxxxxxxx |

FROM FIG. 9C-1

FIG. 9D-1

| NUMBER | SCIENTIFIC NOTATION DECIMAL | MEMORY FORMAT BINARY SIGN$_1$ EXPONENT$_{11}$ MANTISSA 52 |
|---|---|---|
| POSITIVE ZERO | 0 | 0 00000000000 0000000000000000000000000000000000000000000000000000 |
| SMALLEST DENORMALIZED | $2^{-1074}$ | 0 00000000000 0000000000000000000000000000000000000000000000000001 |
| LARGEST DENORMALIZED | $2^{-1022} - 2^{-1074}$ | 0 00000000000 1111111111111111111111111111111111111111111111111111 |
| SMALLEST NORMALIZED | $2^{-1022}$ | 0 00000000001 0000000000000000000000000000000000000000000000000000 |
| POSITIVE ONE | 1 | 0 01111111111 0000000000000000000000000000000000000000000000000000 |
| LARGEST NORMALIZED | $2^{+1024} - 2^{+971}$ | 0 11111111110 1111111111111111111111111111111111111111111111111111 |
| POSITIVE INFINITY | ∞ | 0 11111111111 0000000000000000000000000000000000000000000000000000 |
| POSITIVE NaN | NaNS | 0 11111111111 0000000000000000000000000000000000000000000000000001 |

| INTERNAL REGISTER FILE FORMAT BINARY |
|---|
| SIGN₁ UNUSED₁ EXPONENT₁₁ IMPLIED₁ MANTISSA 52 PARITY 8 |
| 0 0 00000000001 0 0000000000000000000000000000000000000000000000000000 xxxxxxxx |
| 0 0 00000000001 0 0000000000000000000000000000000000000000000000000001 xxxxxxxx |
| 0 0 00000000001 0 1111111111111111111111111111111111111111111111111111 xxxxxxxx |
| 0 0 00000000001 1 0000000000000000000000000000000000000000000000000000 xxxxxxxx |
| 0 0 01111111111 1 1111111111111111111111111111111111111111111111111111 xxxxxxxx |
| 0 0 11111111110 1 1111111111111111111111111111111111111111111111111111 xxxxxxxx |
| 0 0 11111111111 1 0000000000000000000000000000000000000000000000000000 xxxxxxxx |
| 0 0 11111111111 1 0000000000000000000000000000000000000000000000000001 xxxxxxxx |

FROM FIG. 9D-1

SHARING DATA IN INTERNAL AND MEMORY REPRESENTATIONS WITH DYNAMIC DATA-DRIVEN CONVERSION

BACKGROUND

1. Technical Field

The present application relates generally to an improved data processing apparatus and method. More specifically, the present application is directed to an apparatus and method for sharing data in internal and memory representations with dynamic data driven conversion.

2. Description of Related Art

High-performance processors support multimedia-processing using single instruction multiple data (SIMD) techniques for exploiting instruction-level parallelism in programs. That is, SIMD techniques are used for executing more than one operation at a time. These processors contain multiple functional units, some of which are directed to the execution of scalar data and some of which are grouped for the processing of structured SIMD vector data. SIMD data streams are used to represent multimedia datatypes, such as color information, using, for example, the RGB format by encoding the red, green, and blue components in the structured data type, or coordinate information, by encoding position as the quadruple (x, y, z, w). Implementations based on the addition of a full-function SIMD processing block to an existing scalar block lead to large processor cores where multiple units are unnecessarily replicated, each replica dedicated to the processing of either scalar data or one element of the structured multimedia data type.

Processors designed for processing multimedia data have been implemented by augmenting an existing scalar processor implementation, for instance by adding a SIMD unit, the SIMD unit itself consisting of multiple functional units (i.e., fixed point units and floating point units) mirroring resources available for the processing of scalar data types, and replicating each functional unit type for the number of structured elements to be supported by the SIMD architecture. The only units shared between the scalar and SIMD processing units are the issue logic, which issues instructions to either the scalar or SIMD processing blocks, and the load/store unit, which governs access to the memory subsystem. All other units, including the register files, are maintained separate.

SUMMARY

In one illustrative embodiment, a method, in a data processing system, is provided for processing an instruction. The method may comprise determining an original data format of input data upon which the instruction is to operate and determining if a required data format of the instruction does not match the original data format. In response to the required data format of the instruction not matching the original data format, the method may comprise determining if a data value range of the data is natively supported by logic executing the instruction. A data format conversion may be performed in response to the data value range of the data not being natively supported to convert the original data format to the required data format thereby generating data having a converted data format. The instruction may be executed on the data having the converted data format if the data value range of the data is not natively supported.

In another illustrative embodiment, an apparatus is provided that comprises an instruction decode unit, a register file coupled to the instruction decode unit, and one or more functional units coupled to the register file. The instruction decode unit may determine an original data format of input data, read from the register file, upon which the instruction is to operate and determine if a required data format of the instruction does not match the original data format. Moreover, in response to the required data format of the instruction not matching the original data format, the instruction decode unit may determine if a data value range of the data is natively supported by logic executing the instruction. A data format conversion may be performed in response to the data value range of the data not being natively supported to convert the original data format to the required data format thereby generating data having a converted data format. The one or more functional units may execute the instruction on the data having the converted data format if the data value range of the data is not natively supported.

In yet another illustrative embodiment, a computer program product comprising a computer readable or recordable medium having a computer readable program recorded thereon is provided. The computer readable program, when executed on a computing device, may cause the computing device to determine an original data format of input data upon which an instruction is to operate and determine if a required data format of the instruction does not match the original data format. The computer readable program may further cause the computing device, in response to the required data format of the instruction not matching the original data format, to determine if a data value range of the data is natively supported by logic executing the instruction. A data format conversion may be performed in response to the data value range of the data not being natively supported to convert the original data format to the required data format thereby generating data having a converted data format. The instruction may be executed on the data having the converted data format if the data value range of the data is not natively supported.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 9C-1 and 9C-2 provide a diagram illustrating examples of a memory format and an internal format for representing a variety of single precision floating point data values;

FIGS. 9D-1 and 9D-2 provide a diagram illustrating examples of a memory format and an internal format for representing a variety of double precision floating point data values;

Appendix A provides details regarding the floating point processor facility in accordance with one exemplary architecture in which the aspects of the illustrative embodiments may be implemented;

Appendix B provides details regarding the decimal floating point processor facility in accordance with one exemplary architecture in which the aspects of the illustrative embodiments may be implemented;

Appendix C provides details regarding a VMX processor facility in accordance with one exemplary architecture in which the aspects of the illustrative embodiments may be implemented; and Appendix D provides details regarding a VSX processor facility in accordance with one exemplary architecture in which the aspects of the illustrative embodiments may be implemented.

DETAILED DESCRIPTION OF THE ILLUSTRATIVE EMBODIMENTS

As discussed above, to date, processors designed for processing multimedia data have typically been implemented by augmenting an existing scalar processor implementation, for instance by adding a SIMD unit, the SIMD unit itself consisting of multiple functional units (i.e., fixed point units and floating point units) mirroring resources available for the processing of scalar data types, and replicating each functional unit type for the number of structured elements to be supported by the SWID architecture. Often, the only units shared between the scalar and SIMD processing units are the issue logic, which issues instructions to either the scalar or SIMD processing blocks, and the load/store unit, which governs access to the memory subsystem. All other units, including the register files, are maintained separate.

Figure 1:
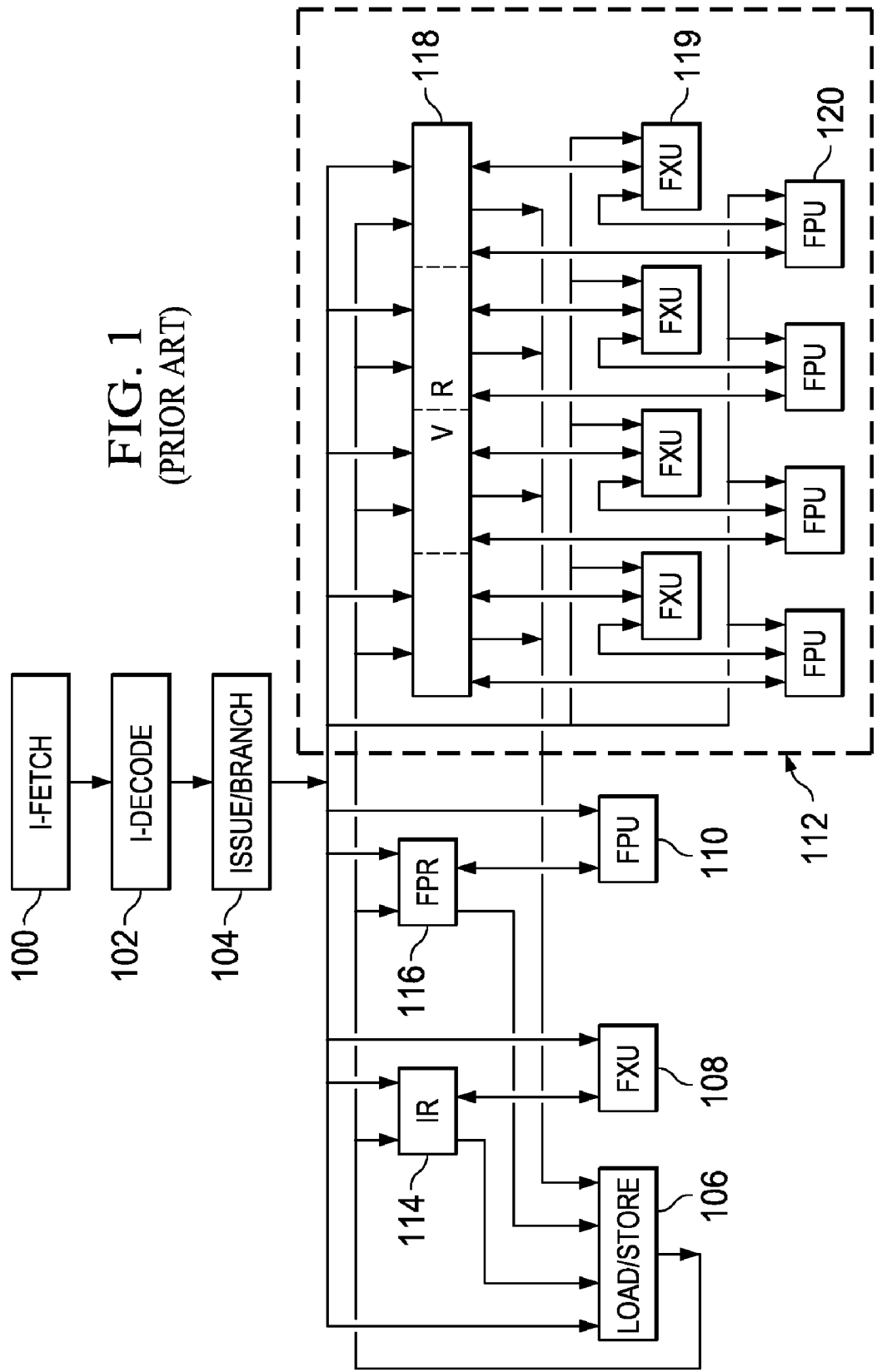
FIG. 1 is a block diagram depicting an example of a prior art processor containing both scalar processing units and a SIMD unit for processing structured data types.

FIG. 1 is a block diagram depicting an example of a prior art processor containing both scalar processing units and a SIMD unit for processing structured data types, the SIMD unit comprising multiple processing units for each element in the structured data type. This processor implementation is exemplary of prior art systems; in some implementations, some register files may be shared, e.g., a combined integer and floating point register file, or additional register files may be present, such as a condition register file or a predicate register file for comparison results. But in general, the use of separate scalar and SIMD processors is inefficient and expensive in that such a configuration includes a number of redundant functional units and data paths. Furthermore, such implementations result in an undesirable amount of power consumption since while either the scalar or SIMD unit is processing data, the other is generally sitting idly by, awaiting its next instruction, but all the while consuming system power.

During operation of the system of FIG. 1, instructions are fetched by instruction fetch unit 100, and supplied to an instruction decode unit 102. Decoded instructions are passed to an issue/branch unit 104, where branch instructions are resolved and other instructions can be stored in the instruction issue unit thereof (not shown) until they can be executed in one of the functional units of the processor. The instruction issue unit can contain prediction logic, instruction reordering logic, instruction issue buffers and other logic supporting the high-performance issuing of instructions.

Instructions are issued by the issue/branch unit 104 to one or more of the load/store unit 106, the fixed-point unit 108, the floating-point unit 110, or the SIMD processing block 112. Before instructions can be processed by one or more of the processing units, one or more register accesses are usually required in a register file, e.g., the integer register file 114, the floating point register file 116, or the vector register file 118 which is a part of the SIMD multimedia extension found in many contemporary processors.

The SIMD multimedia processing block 112 typically contains a vector register file 118 for storing structured data (usually a vector consisting of four elements). The vector register file 118 may be segmented into four sub-register files, each storing a single field of the structured data. The SIMD multimedia processor block 112 may contain several types of function units, each type being replicated for the number of elements in the structured data type supported by the multimedia extension. In FIG. 1, there are shown fixed point units 119 and floating point units 120 replicated four times to process one structure element each as can be found in the PowerPC™ VMX multimedia extension.

It can be seen that, where both scalar and SIMD instruction execution are provided, separately addressable register files are typically required for the various types of instructions that may be encountered by the CPU. For example, as shown in FIG. 1, a separate integer register file 114, floating point register file 116, and vector register file 118 are provided. Having separate registers files in this manner is expensive in terms of overhead as well as power consumption. Having multiple register files means that as code is executed, the code must switch or move between the various register files. This makes code generation expensive in terms of the overhead associated with moving between the various register files. Moreover, a compiler of the code may require more of one or another set of resources associated with the register files leading to register file fragmentation. Furthermore, having separate resources in the micro-architecture of the CPU increases the costs associated with fabrication of the CPU as well as costs associated with power consumption, heat dissipation, etc.

In U.S. Pat. No. 6,839,828, a combined scalar/vector addressable register file is described along with a processor designed to operate in a plurality of modes for processing vector and scalar instructions. A parallel vector unit, coupled to the register files, includes functional units configurable to operate in a vector operation mode and a scalar operation mode. The vector unit includes an apparatus for tightly coupling the functional units to perform an operation specified by a current instruction. Under a vector operation mode, the vector unit performs, in parallel, a single vector operation on a plurality of data elements. The operations performed on the plurality of data elements are each performed by a different functional unit of the vector unit. Under a scalar operation mode, the vector unit performs a scalar operation on a data element received from the register files in a functional unit within the vector unit.

While the mechanism of U.S. Pat. No. 6,839,828 provides the ability to store different types of instructions/data in the register file, in order to achieve this ability, the '828 patent sets forth a new architecture. The problem with defining a new architecture in this manner is that the new architecture precludes the successful compatible execution of legacy programs, i.e. pre-existing applications designed for execution by a previous architecture. Furthermore, the pre-existing legacy architectures supporting the legacy programs may contain assumptions and require specific data formats for scalar and vector data, making transparent sharing of scalar and vector data impossible in the prior art. Thus, the mechanisms of the '828 patent do not provide for multi-addressability, i.e. different ways of addressing registers in the register file based on the instruction type, e.g., legacy scalar, legacy vector, or a new instruction type.

The illustrative embodiments provide an apparatus and method for providing a multi-addressable register file. With the mechanisms of the illustrative embodiments, a single register file may be addressed using both scalar and SIMD instructions. That is, subsets of registers within a multi-addressable register file according to the illustrative embodiments, are addressable with different instruction forms, e.g., scalar instructions, SIMD instructions, etc., while the entire set of registers may be addressed with yet another form of instructions, referred to herein as Vector-Scalar (VSX) instructions in accordance with an exemplary embodiment. The types of operations, i.e. the operation set, that may be performed on the entire set of registers using the VSX instruction form is substantially similar to that of the operation sets of the subsets of registers.

The multi-addressable register file allows legacy instructions to access subsets of registers within the multi-addressable register file while new instructions, i.e. the VSX instructions, may access the entire range of registers within the multi-addressable register file. Moreover, the data formats of the legacy instructions are compatible with the data format of the new instructions. Thus, data generated by legacy instructions may be processed by the new instructions and vice versa.

Decoding logic is added to an instruction decode unit of a processor for handling the three types of instructions using the single register file of the illustrative embodiments. The decoding logic determines the type of instruction and, based on the type of instruction, generates a register specifier that specifies the register. A full register specifier for the entire register file is then generated based on the type of instruction and the register specifier. Registers within a corresponding subset of registers in the register file are then addressed using the full specifier. Results of the operation are then computed based on the addressing of the subset of registers using the full specifier with results of the operation being written back to the subset of registers in the register file.

As one example, in legacy vector or legacy scalar instructions, a 5-bit specifier may be utilized while a 6 bit specifier may be used with new VSX instructions. The register file may be accessed using the 6 bit specifier, i.e. full register specifier, in an architected manner. To accomplish this, the 5-bit specifier may be extended to a 6-bit specifier, i.e. a full register specifier.

In one embodiment, the full register specifier is used to access the register file directly. In another embodiment, the full specifier is used as a logical register file specifier which is then renamed by a register mapper (also know as register rename logic) to a physical register file number.

In another aspect of the invention at least one subset of instructions access a full register within the register file, whereas another subset accesses a portion of a register file. In one embodiment, said full and partial access is used by read accesses. In another embodiment, this is used for write accesses. In yet another embodiment, this is used for read and write accesses.

Thus, the illustrative embodiments provide mechanisms for implementing a multi-addressable register file in which both legacy floating point and scalar instructions, as well as new vector-scalar instructions, may access the register file as well as share data between different types of instructions via the register file. Known register file mechanisms do not provide multi-addressability in this manner, but only the ability to store different types of instructions in the register file. In contrast, the illustrative embodiments allow, for example, legacy floating point instructions to work on values stored in vector-scalar extension (VSX) registers 0-31 of the register file, legacy vector multimedia extension (VMX) instructions to work on registers 32 to 63 (while continuing to refer to registers 0 to 31 in the actual instructions), and new VSX instructions to refer to registers 0 to 63 of the register file. Furthermore, the illustrative embodiments permit sharing of data between VSX and legacy floating point (scalar) instructions in registers 0 to 31 and sharing of data between legacy VMX (vector) and new VSX instructions in VSX registers 32 and 63 of the register file. Such sharing of data is permitted while continuing to execute programs that use either one or both of legacy floating point and legacy VMX instructions without any modification, and continuing to link code modules that use either one or both of legacy floating point and legacy VMX instructions without any modification to code modules that employ the new VSX instructions.

In addition to the above, the mechanisms of the illustrative embodiments provide functionality for performing dynamic data-driven conversion of data formats such that data may be stored and accessed by instructions using different representations, e.g., an internal representation and a memory representation. The mechanisms of the illustrative embodiments determine the data type of the operand being accessed as well as analyze the data value subrange of the input operand data type. The operation first determines if the operand's data type matches the required format of the instruction being processed.

In one exemplary embodiment, functional units for processing VMX instructions use memory format with a bit for bit correspondence being guaranteed between integer VMX instructions and floating point VMX instructions in accordance with the IEEE number encoding standard and the arithmetic supported by the VMX instruction set. In the same exemplary embodiment, functional units for processing legacy floating point instructions are equipped to process data in an internal format in order to optimize data reformatting between different floating point precision formats.

In accordance with an exemplary embodiment, VSX instruction functional units consists of two categories of instruction execution units, those equipped to process integer inputs and those equipped to process floating point inputs. In accordance with an exemplary embodiment, VSX instructions directed at floating point execution are implemented to accept floating point inputs in either memory or internal format. However, VSX instructions directed at integer instructions are implemented to accept memory format only. Thus, when data generated by a legacy floating point instruction, in internal format, is accessed by a VSX instruction directed at integer processing, a data format mismatch occurs.

When an instruction accepting only one format is executed, the operation first determines if the operand's data type matches the required format of the instruction being processed. If not, a determination is made as to whether a subrange of data values of the data type of the input operand is supported natively by the range of values for the required instruction data type. In accordance with one illustrative embodiment, some data values in internal representation match the memory format, and conversion is not necessary. When the input is not in the necessary format, conversion is performed. In accordance with another illustrative embodiment, an instruction corresponding to memory format is extended to also accept some values, but not all values, in internal format. When the input is not in the necessary format, and it does not correspond to the specific values in internal format that are supported, conversion is performed on such internal data format values. In one illustrative embodiment, the check of the operand data type against the required format for the instruction being processed determines whether the value in internal format for a double precision value corresponds to a single precision value represented as an un-normalized number which should be renormalized.

If the subrange of data values of the input operand is not supported natively by the range of values for the required instruction data type, then a format conversion operation is performed on the data and the instruction may then operate on the data. Otherwise, if the subrange of data values of the input operand is supported natively by the range of values for the required instruction data type, then the data may be operated on directly by the instruction without a format conversion operation and thus, the conversion is not performed.

As stated above, the illustrative embodiments provide an apparatus and method for providing a multi-addressable register file and for sharing data in internal and memory representations with dynamic data driven conversion Such a multi-addressable register file may be implemented in a processor of a data processing system. Such a data processing system may have one or more processors in which each processor, or a subset of processors, may implement the multi-addressable register file of the illustrative embodiments. The types of data processing systems in which processors having a multi-addressable register file in accordance with the illustrative embodiments may vary considerably and thus, the present description cannot address each such possible processor architecture. However, for purposes of illustration, FIG. 2 is provided as an example of one type of data processing system in which the multi-addressable register file of the illustrative embodiments may be implemented.

Figure 2:
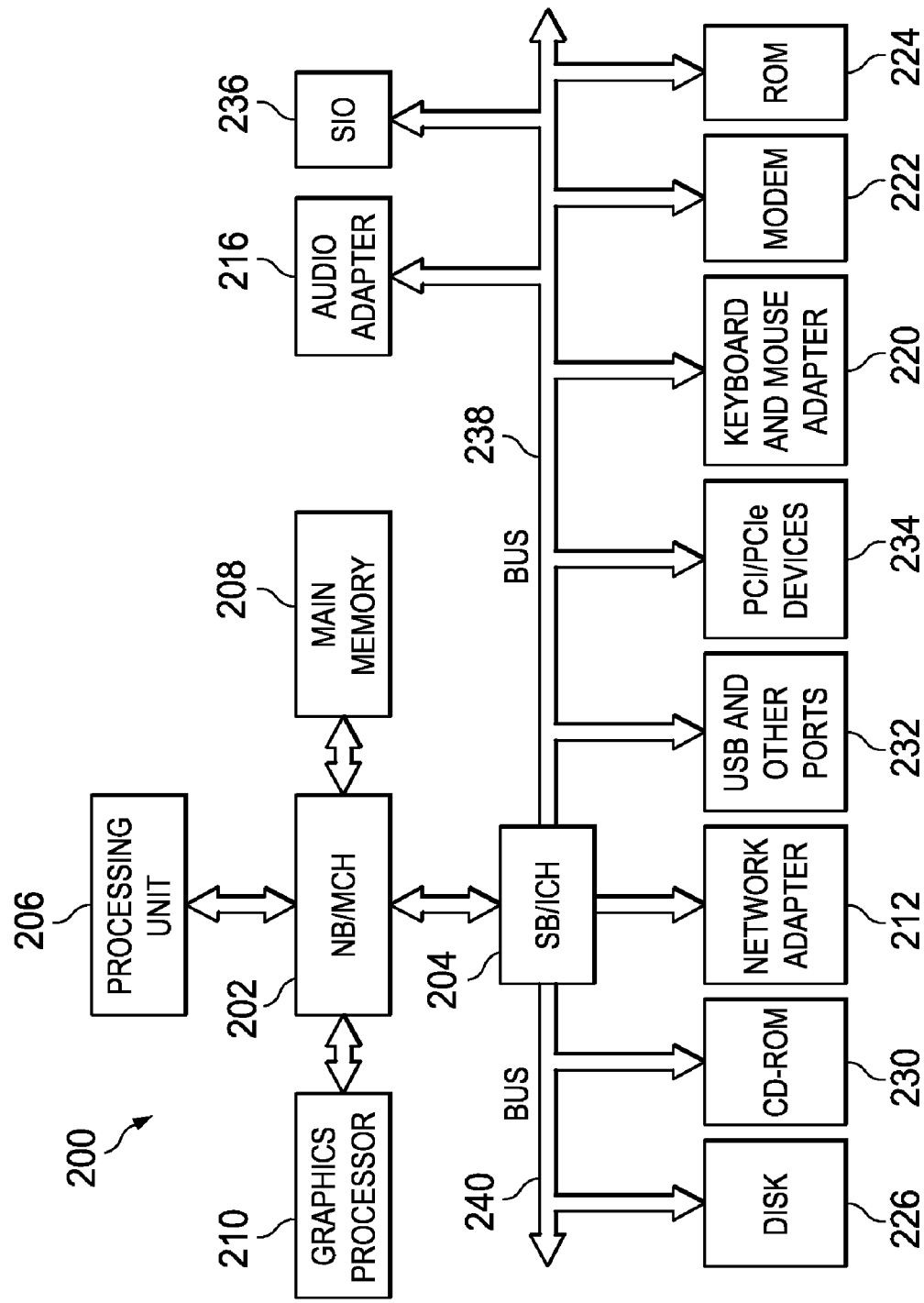
FIG. 2 is an exemplary diagram of a data processing system in which exemplary aspects of the illustrative embodiments may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both) or the Linux® operating system (LINUX is a trademark of Linus Torvalds in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p computer system, running the Advanced Interactive Executive (AIX®) operating system or the LINUX® operating system (eServer, System P™ and AIX are trademarks of International Business Machines Corporation in the United States, other countries, or both). Data processing system 200 may be a symmetric multiprocessor (SMP) system including a plurality of processors, such as the POWER™ processor available from International Business Machines Corporation of Armonk, N.Y., in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As discussed above, the illustrative embodiments provide an apparatus and method for providing a multi-addressable register file and a method and apparatus for dynamic data driven conversion of data values such that data in internal format and memory format may be shared amongst instructions. The illustrative embodiments improve upon known register files by including the capability of the register file by providing a large number of registers and an ability to address a first subset of registers with a first set of instructions, address a second subset of registers with a second set of instructions, and to address the entire register file with at least a third set of instructions. In accordance with the illustrative embodiments, the first and second subsets of register are non-overlapping and refer to distinct register file areas, such as "registers for instructions of type 1" and "registers for instructions of type 2." A register contained within the subset corresponding to instructions of type 1 cannot be accessed by instructions of type 2, and vice versa. In one illustrative embodiment, the type 1 instructions correspond to IBM Power Architecture FPU, or legacy floating point instructions, the type 2 instructions correspond to IBM Power Architecture legacy VMX instructions, and the type 3 instructions correspond to IBM Power Architecture VSX instructions.

The mechanisms of the illustrative embodiments differ from known clustered register files, operand subranges within register files, processors with "move between register file" instructions, and VMX128 register files, which uses a form of subranges with non-contiguous register specifiers. With operand subranges, typically there is one subrange for one operand only, i.e. one type of instruction. There is no other instruction type that has another form that may address all registers in the register file and there is no other range of registers for another type of instructions, i.e. there is no multi-addressability functionality. Clustered register files comprise a large register file with sub-ranges addressable by different instructions, but there is no instruction type that may address all of the registers in the register file. To the contrary, if operations are to be performed on the full set of registers, then move/copy operations must be performed on the register file. These move/copy operations are usually slower operations that may require special scheduling mechanisms.

In contradistinction, the illustrative embodiments provide access to the registers of the multi-addressable register file based on the instruction type, e.g., legacy floating point, legacy scalar, new vector-scalar, etc. Rather than one subset of registers associated with one operand type, the multi-addressable register file of the illustrative embodiments provides multiple disjointed subsets of registers. The multiple subsets of registers, in the multi-addressable register file, associated with the various types of instructions are contiguous ranges of registers. Moreover, with the illustrative embodiments, while instructions of different types may access non-overlapping subsets of registers in the multi-addressable register file, at least one type of instruction may also access all of the registers in the multi-addressable register file.

In another aspect of the present invention the illustrative embodiments extend known scalar/vector register files by including an ability to execute scalar, vector, and floating point instructions using the same register file with the portion of the register file to be accessed being dynamically determined based on the type of instruction being executed. Since the illustrative embodiments improve upon known scalar/vector register files, and the processors that use such scalar/vector register files, it is important to first understand the basic operation of such a processor and scalar/vector register file. The following description of FIGS. 3A and 3B will make reference to commonly assigned U.S. Pat. No. 6,839,828 as exemplary of such a known scalar/vector register file and processor.

Figure 3A:
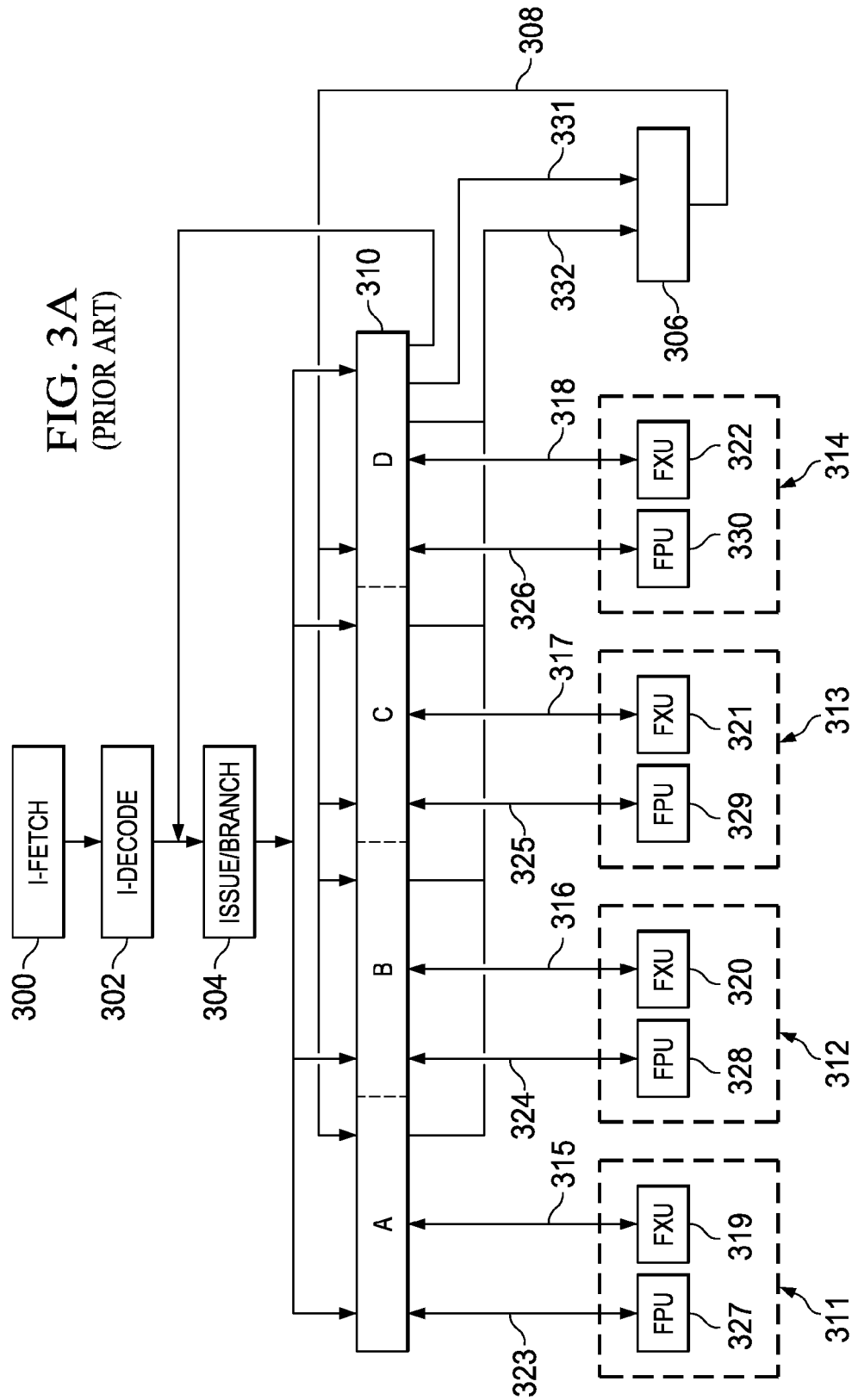
FIG. 3A is an exemplary diagram of a processor designed to execute both a scalar and vector instructions using a register file storing both scalar and vector data and address information in accordance with U.S. Pat. No. 6,839,828.

FIG. 3A is an exemplary diagram of a processor designed to execute both a scalar and vector instructions using a register file storing both scalar and vector data and address information in accordance with U.S. Pat. No. 6,839,828. In the processor shown in FIG. 3A, scalar and SIMD data path processing capabilities have been combined with the SIMD vector data path now subsuming scalar processing. Scalar processing preferably occurs in one of the units used for processing one element of a vector data type. This data unit is designated the "preferred slot" and provides addresses for the branch unit and the load/store unit, as will be described below. For simplicity, the depiction of the unified processor in FIG. 3A includes data flow connections only, and not control signal connections and external system interfaces, e.g., address lines, connections with memory, etc. The latter connections are assumed.

The unified processor of FIG. 3A includes an instruction fetch unit 300, which fetches instructions and data from the system's memory hierarchy (not shown) based upon the value of the fetch unit's program counter. Fetched instructions are provided by instruction fetch unit 300 to instruction decode unit 302, where they are decoded and expanded into appropriate control signals for controlling downstream units. The expanded instruction is passed to issue/branch unit 304, where it is placed into an instruction queue to await availability of appropriate functional units for processing. In the event that the instruction is a branch, control is returned to instruction fetch unit 300, which fetches the branch-target instruction, and the above process is repeated.

In the case of a scalar operation, when a functional unit (i.e., fixed point unit or floating point unit) becomes available or in the case of a vector operation, when multiple functional units become available, the issue/branch unit 304 issues the instruction to the one or more functional units. Before computation can be performed, source operand data is retrieved by accessing a scalar-vector register file (SVRF) 310. Multiple types of function units are typically provided, e.g., fixed point units, floating point units, and a load/store unit (LSU) 306, the latter fetching from and storing to the memory hierarchy the data identified by the current instruction. The LSU 306 stores the result of memory accesses back to the combined SVRF 310 via bus 308. In this embodiment, SVRF 310 stores data lines consisting of four scalar data words, each line being partitioned such that each of the four data words is associated with a different functional unit pair (or set) 311-314, each functional unit pair consisting of a fixed point unit and a floating point unit as shown. The functional unit pairs make up what is referred to herein as a parallel vector unit.

Issue logic directs the SVRF 310 to pass the contents of a data line to the appropriate functional unit within each set of functional units, for processing. There may be any number and type of functional units associated with an issue slot, including, but not limited to, fixed-point unit, floating-point unit, comparison unit, logical operation unit, shift unit, etc. The particular functional unit within the set that will use the data word will depend on the instruction to be executed, and is controlled by a signal from issue/branch unit 304. Thus, if the instruction requires the fixed point units to operate on the data, data will be passed to fixed point units 319-322 via lines 315-318. If the instructions require floating point units 327-330, data will be passed via lines 323-326. If other functional unit types were present, data would similarly be passed to them. When each designated functional unit has performed its operation on the input data, it passes a result back to SVRF 310, where it is stored until requested by LSU 306, or passed to the functional units for further manipulation.

The operations to be performed by the functional units, and the functional units to perform those operations, are determined by control signals provided by issue/branch unit 304. When an operation directs the LSU 306 to read data from SVRF 310, the data is passed via data bus 332. In addition, the address to which the data is to be stored in memory is passed to LSU 306 via bus 331. In the embodiment of FIG. 3A, address bus 331 passes information from a segment (D) of SVRF 310, which is associated with functional unit pair 314 (this pair being designated a preferred slot, as described later). The preferred slot could be any of the functional units, by either defining them as preferred slot, or by means of dynamically determining a preferred slot, either by setting a control register, specifying a slot in the instruction word, or by determining it using any other means, e.g., by the issue unit at issue time. The designation of a preferred slot allows for selective powering-down of functional units, resulting in power savings.

To this point, the described operation of the unified processor has applied to both scalar and vector operations. That is, if an operation to be performed is a scalar operation, thus requiring operation and output of only one functional unit pair, the remaining functional unit pairs may nevertheless be directed to perform the same operation on data passed to them from the scalar vector register file. Such an approach allows for simplicity of design, since to require different functional units to simultaneously execute different operations necessarily introduces complicating design considerations. Likewise, for a vector operation, each functional unit pair will perform the same operation (or substantially the same operation as part of a tightly coupled operation, or a combination of tightly coupled operations as specified by a single instruction) on incoming data.

Scalar and vector operations are distinguished by the manner in which associated address information is used, in accordance with the interpretation of the operation. The operation's interpretation may be a direct result of its operation code, that is, different operation codes may be available for different instructions (e.g., "load scalar byte," "load scalar word," "load scalar vector") or may depend on another part of the system, e.g., mode tag bits to interpret a single "load" opcode. Even scalar data spans an address range of bytes (although fewer bytes than a vector) and there are also variations on how load/store may operate.

Unlike other functional units, which are typically assigned to a specific slot within the SVRF 310, the LSU 306 operates on the entire line of data, or a subset thereof, contained within SVRF 310. The LSU 306 operates in either load or store operation mode, depending on the instruction issued by the issue/branch unit 304. In load mode, LSU 306 receives address information from the preferred slot of the SVRF 310 using bus 331, and loads data from the specified address. When a load vector instruction is being executed, the load operation loads an entire line of data from memory to SVRF 310 using bus 308. When a load scalar operation is specified, the load operation will load at least the number of bits corresponding to the size of the scalar type (typically, byte, halfword, word, and so forth). Additional bits may be loaded in accordance with implementation choices, or invalid data, or data initialized to a default value (such as, but not limited to, "0") may be provided for those bits outside the range of the requested data type. In one embodiment, the "load scalar" operation includes an alignment step, wherein a requested scalar value is aligned in the preferred slot before being stored to SVRF 310. In another embodiment, alignment is performed programmatically using a sequence of one or more instructions.

In the store mode of operation, the LSU 306 receives data to be stored from the SVRF 310 by means of bus 332, and address information from the preferred slot of the SVRF 310 using bus 331, and stores data to the specified address.

Figure 3B:
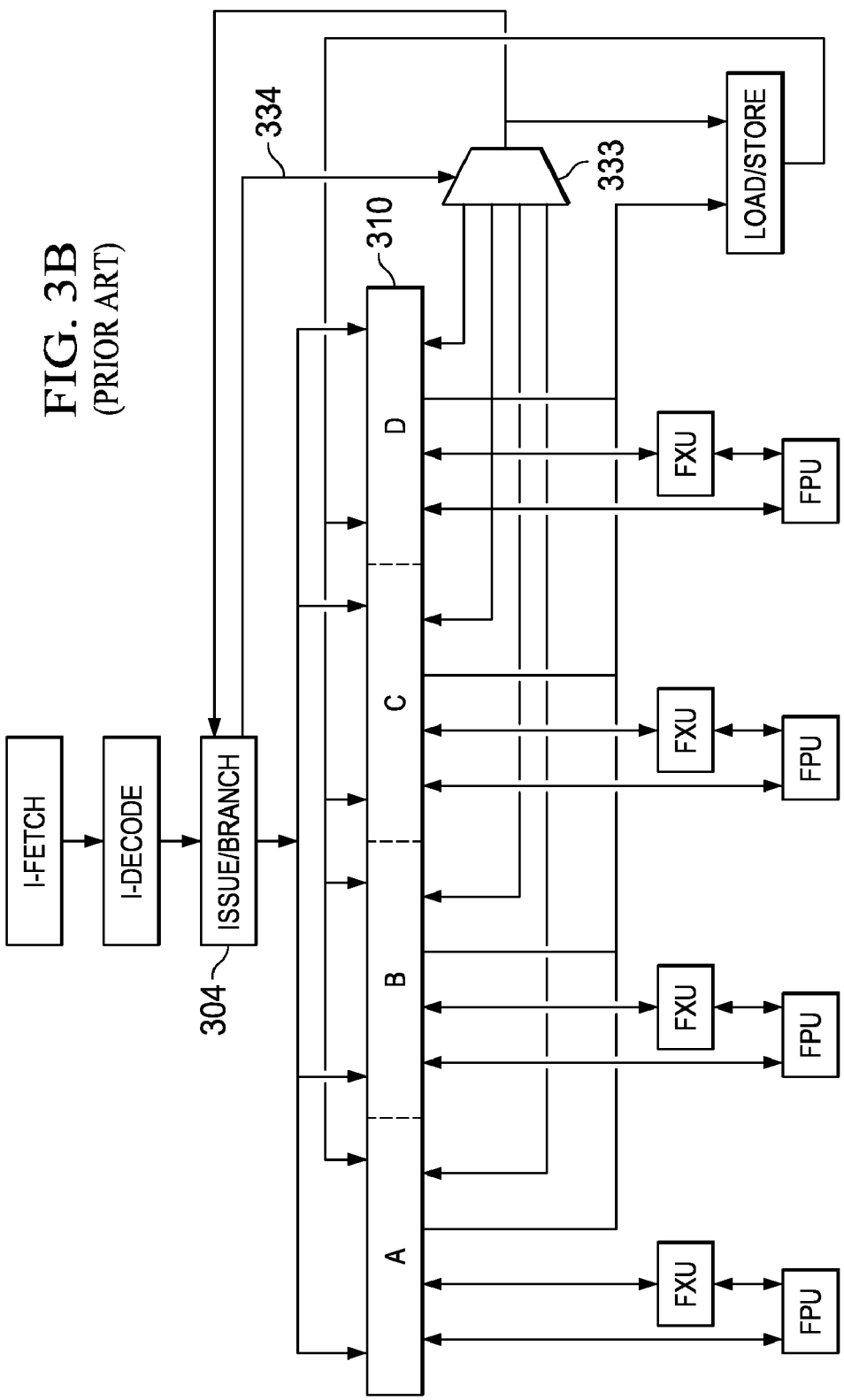
FIG. 3B shows a more flexible, although slightly more complex, approach to selecting scalar data for information as may be used by the branch unit and LSU in accordance with U.S. Pat. No. 6,839,828.

FIG. 3B shows a more flexible, although slightly more complex, approach to selecting scalar data for information as may be used by the branch unit and LSU in accordance with U.S. Pat. No. 6,839,828. In accordance with this embodiment, the various segments of SVRF 310 are selectable by means of a multiplexer 333, which may be controlled with a control input via line 334 from issue/branch unit 304 (which may typically come from a field in the instruction word of the instruction to be executed). Alternate embodiments may include, but are not limited to, a software-controlled special purpose register or a boot-time parameter for supplying the control input of the multiplexer.

The embodiment shown in FIG. 3B operates as follows. When a scalar data value is required by either the load/store unit to supply a memory address for an operation, or by the branch unit to supply, e.g., a branch target address, or a branch condition, or by a shift unit requiring a single shift count to be applied to all elements, or any other unit which may require a scalar data value as its input, the multiplexer 333 is steered by the control input to select one of slots A, B, C, or D as the scalar input for the operation. Thus, in accordance with this embodiment, any of the functional unit pairs can be selected as a "preferred slot", allowing processing operations to be balanced, reduce the need for transfer operations between multiple slots and increase the number of slots in which scalar values can be stored.

Thus, U.S. Pat. No. 6,839,828 describes two different implementations of a preferred slot for scalar processing. The first being a hardwired implementation, wherein the preferred slot is selected at the design phase, and a variable approach, where the preferred slot can be selected on the fly, during execution. As mentioned in the '828 patent, designation of a preferred slot at design time can simplify the implementation in that the above-described selection need not be provided. Moreover, use of identical functional unit pairs may be more efficient, even at the slight overhead cost of having useless circuitry which is never exercised for the preferred slot.

While the register file mechanisms of U.S. Pat. No. 6,839,828, and other known register file mechanisms, allow for a single register file to be used for both scalar and vector operations, the known register file mechanisms do not provide multi-addressability, but only the ability to store different types of instructions/data in a single register file. A complex new architecture and/or operations for handling the different types of instructions/data in the single register file. This precludes the architecture from being able to process legacy programs, as discussed previously above. Moreover, the prior art does not provide multi-addressability, but only the ability to store different types of instructions in the register file.

In contrast, the illustrative embodiments provide an apparatus and method for providing a multi-addressable register file that permits both legacy instructions and a new type of instruction to access the registers of the multi-addressable register file. With the mechanisms of the illustrative embodiments, a single register file may be addressed using both scalar and Single Instruction Multiple Data (SIMD) or vector instructions. That is, subsets of registers within a multi-addressable register file according to the illustrative embodiments, are addressable with different instruction forms, e.g., scalar instructions, SIMD or vector instructions, etc., while the entire set of registers may be addressed with yet another form of instructions, referred to herein as Vector-ScalarX (VSX) instructions. The types of operations, i.e. the operation set, that may be performed on the entire set of registers using the VSX instruction form is substantially similar to that of the operation sets of the subsets of registers.

The multi-addressable register file of the illustrative embodiments allows legacy instructions to access subsets of registers within the multi-addressable register file while new instructions, i.e. the VSX instructions, may access the entire range of registers within the multi-addressable register file. Moreover, the data formats of the legacy instructions are compatible with the data format of the new instructions. Thus, data generated by legacy instructions may be processed by the new instructions and vice versa.

For example, the illustrative embodiments allow legacy floating point instructions (scalar operations) to work on values stored in a first subset of registers of a register file, e.g., VSX registers 0-31, legacy VMX instructions (vector operations) to work on a second subset of registers in the register file, e.g., VSX registers 32 to 63 (while continuing to refer to registers 0 to 31 in the actual instructions), and new VSX instructions (vector-scalar operations) to operate on all of the registers of the register file, e.g., VSX registers 0 to 63. The illustrative embodiments further allow instructions of different types to share data using the various subsets of registers and the ability of the new instruction type, i.e. VSX instructions, to access all of the registers of the register file. For example, data may be shared between VSX and legacy floating point instructions by storing and accessing data in VSX registers 0 to 31. Similarly, the illustrative embodiments allow data to be shared between legacy VMX instructions and new VSX instructions in VSX registers 32 and 63, while continuing to execute programs that use either one or both of legacy floating point and legacy VMX instructions without any modification. Moreover, the illustrative embodiments permit linking code modules that use either one or both of legacy floating point and legacy VMX instructions without any modification to code modules that employ the new VSX instructions as well as share data between code modules computing with legacy instructions and those using new instructions.

Figure 4:
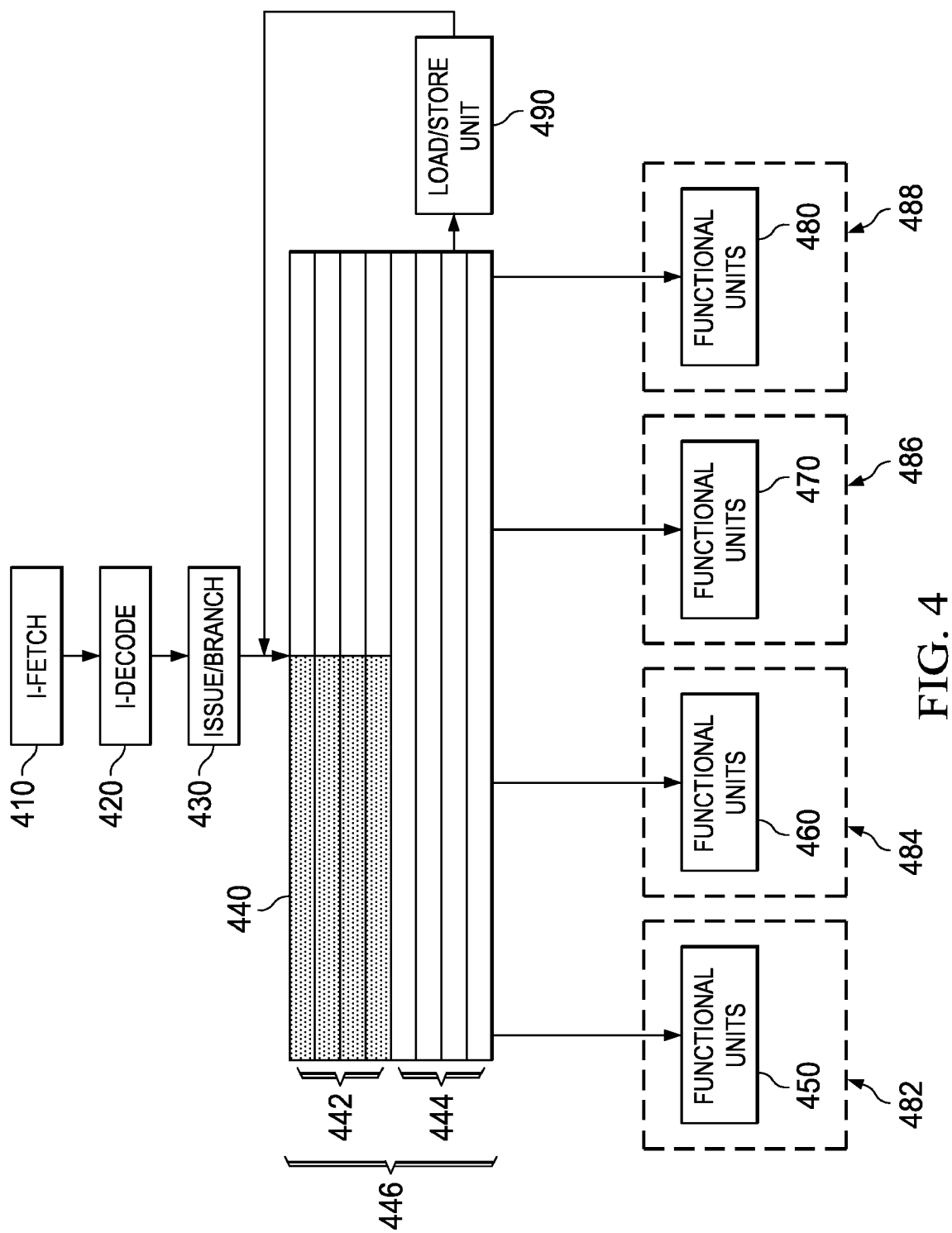
FIG. 4 is an exemplary diagram of a processor in which a multi-addressable register file is utilized in accordance with one illustrative embodiment.

FIG. 4 is an exemplary diagram of a processor in which a multi-addressable register file is utilized in accordance with one illustrative embodiment. As shown in FIG. 4, the processor 400 is similar in configuration to the processor of FIG. 3A with the exception of the configuration and utilization of the register file 440. The instruction fetch unit 410, issue/branch unit 430, functional units 450-480 of the functional unit pairs (or sets) 482-488, and load/store unit 490 all operate in a similar manner as described above with regard to FIG. 3A. The instruction decode unit 420 has additional logic, as described hereafter, that is used to decode instructions of three different types: vector, scalar, and a new vector-scalar instruction type. In one illustrative embodiment, these three different types of instructions are vector multimedia extension (VMX) instructions (e.g., a vector operation), floating point (FP) instructions (e.g., a scalar operation), and new Vector-ScalarX (VSX) instructions. FP operations are generally known in the art. VMX instructions are used in the POWER 6 processor, available from International Business Machines Corporation of Armonk, N.Y. and provide single instructions that operate on multiple data elements. VSX instructions will be described in greater detail hereafter.

Based on the decoded instructions, the instruction will access either a sub-range of the register file 440 or the entire range of registers in the register file 440. If the instruction is determined by the instruction decode unit 420 to be a legacy floating point instruction, then a first sub-range 442 of the register file 440 is accessed, with the data being provided to appropriate functional units 450-480 for processing. If the instruction is determined by the instruction decode unit 420 to be a legacy VMX vector instruction, then a second sub-range 444 of the register file 440 is accessed, with the data again being provided to appropriate functional units 450-480 for processing. If the instruction is determined by the instruction decode unit 420 to be a VSX instruction, then a the entire range 446 of the register file 440 may be accessed, with the data being provided to appropriate functional units 450-480 for processing. Depending on the particular VSX instruction being executed, a VSX instruction accessing any of registers 446 can use either the entire width of the register to obtain input data (corresponding to a new VSX vector instruction and providing access to all registers of register file 446 in each of the operand positions of the instruction), or a portion thereof (corresponding to a new VSX scalar instruction and providing access to all registers of register file 446 in each of the operand positions of the instruction, but using only a subset of bits contained therein)

The first sub-range 442 comprises a first range of bits of a first set of registers in the register file 440. The second sub-range 444 comprises a second range of bits of a second set of registers in the register file. The third range 446 comprises an entire range of bits of the entire set of registers in the register file 440. In this way, a single register file 440 may be used to process both legacy scalar and legacy vector instructions as well as a new combined set of vector-scalar instructions, referred to herein as VSX instructions.

VSX instructions are new instructions that can access the entire set of registers of a register file 440. The VSX instruction set consists of several classes of instructions, including single precision scalar floating point instructions accessing a 32-bit subrange of each register of the entire register file 440, double precision scalar floating point instructions accessing a 64-bit subrange of each register of the entire register file 440, and new vector instructions accessing the entire range of bits in the entire register file 440. The VSX instructions use a new type of register specifier, e.g., a 6 bit register specifier as opposed to a legacy 5 bit specifier that is used by legacy scalar and legacy vector instructions.

Thus, the illustrative embodiments provide a single scalar/vector architecture for a register file that is compatible with legacy architectures having separate scalar and vector register files. The illustrative embodiments further allow sharing of the storage space of the processor between legacy register files and a new expanded vector-scalar register file without leading to increased chip area. Moreover, the illustrative embodiments allow data sharing between legacy programs and libraries using legacy instructions, and new programs and libraries (using either legacy or new instructions), as well as interoperation of code, thereby protecting investment in code tuning of legacy applications and avoiding the need to recode all applications to use the new instructions while allowing the new instructions to be used where they are most profitable As a result, the expensive overhead experienced by known processor architectures that utilize separate register files for scalar and vector, e.g., single instruction multiple data (SIMD), instructions, as well as the additional costs involved with complex new architectures for handling both scalar and vector instructions using a single register file, may be avoided.

The register file 440 is comprised of a plurality of vector-scalar registers (VSRs), each VSR having a plurality of bits. For example, the register file 440 may be comprised of 64 VSRs numbered VSR[0] to VSR[63] with each VSR having 128 bits numbered 0 to 127. For representation purposes, it will be assumed that VSRs are numbered consecutively from the top to the bottom of the register file 440 with bits being numbered consecutively from left to right of the register file 440. This is shown in FIG. 5 discussed hereafter.

Figure 5:
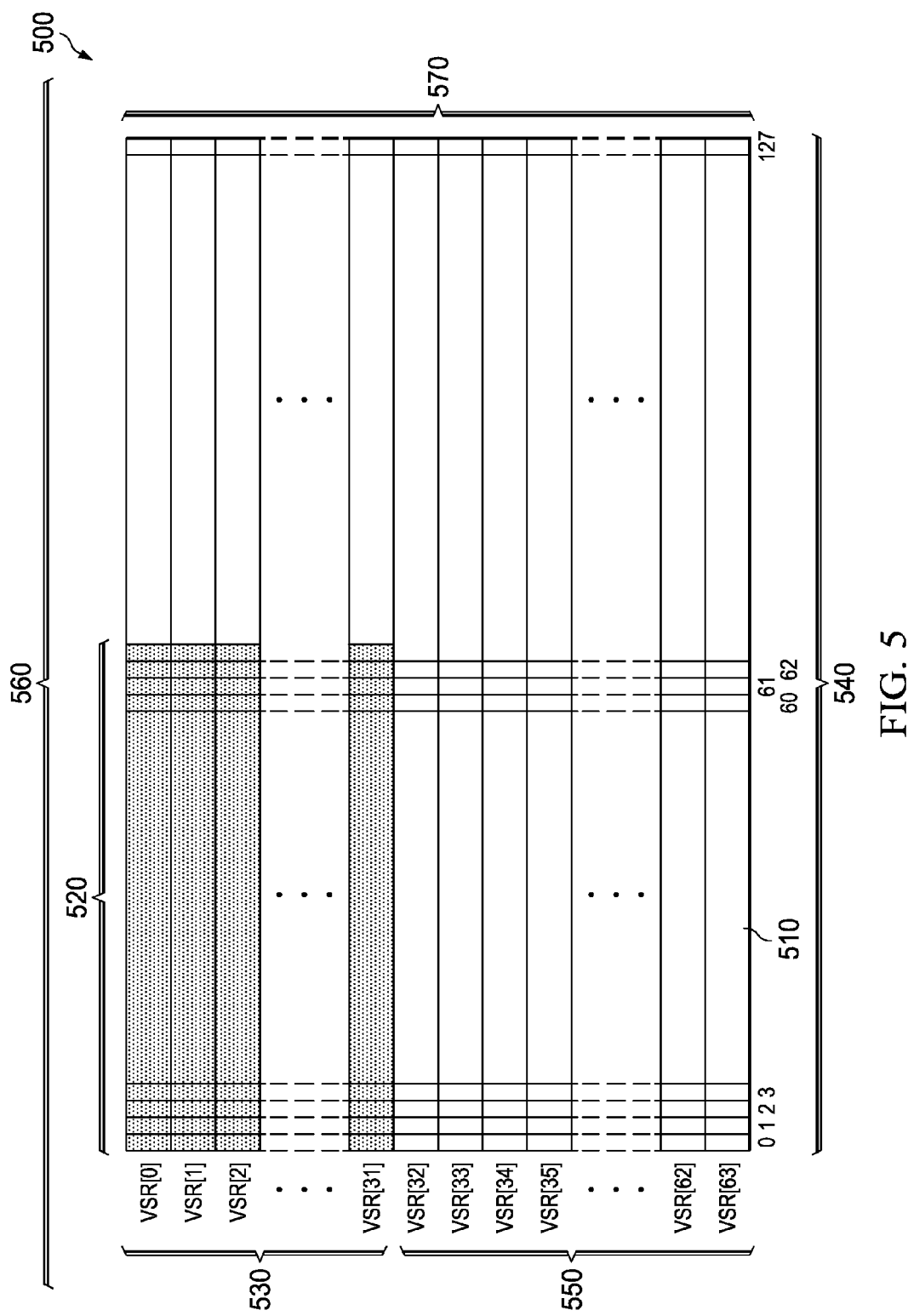
FIG. 5 is an exemplary diagram of a Vector-Scalar (VSX) register file in accordance with one illustrative embodiment.

FIG. 5 is an exemplary diagram of a Vector-ScalarX (VSX) register file in accordance with one illustrative embodiment. The VSX register file 500 of FIG. 5 may be utilized as register file 440, for example. As shown in FIG. 5, the VSX register file 500 includes a plurality of vector-scalar registers (VSRs) 510 numbered VSR[0] to VSR[63]. Each of the VSRs 510 has a predetermined number of bits that may be set. In the depicted example, each VSR 510 has 182 bits numbered 0 to 127 for storing data corresponding to instructions, such as for parameter passing.

A first sub-range of bits 520 in a first set of registers 530 of the register file 500 is associated with a first type of instruction, such as a scalar or floating point instruction. A second sub-range of bits 540 in a second set of registers 550 in the register file 500 is associated with a second type of instruction, such as a vector, SIMD, or VMX instruction. A third range of bits 560 in the entire set of registers 570 of the register file 500 is associated with a third type of instruction, such as a VSX instruction.

It can be appreciated from FIG. 5 that the VSX register file 500 differs from known register files in known systems by allowing three different types of instructions to access registers of the VSX register file 500 based on associated register ranges and bit widths within the registers. Known register files, upon which the mechanisms of the illustrative embodiments improve, require that the entire register file be accessed in the same manner for all types of instructions by specifying the register to be accessed with respect to the entire set of registers 570 rather than with respect to a subset of registers that corresponds to all operands of a specific instruction type.

With the VSX register file 500, when a legacy scalar operation is to read/write data from/to the VSX register file 500, in one illustrative embodiment, the scalar data value is read/written from/to the left side of the register width, i.e. bits 0 to 63 of registers VSR[0] to VSR[31], for example first sub-range 520. There are a number of ways writing of scalar values to the vector-scalar registers (VSRs) may be accomplished with the illustrative embodiments. In one illustrative embodiment, all of the bits of the VSR may be written with the scalar value being written to bits 0 to 63 while values corresponding to the result of a vector computation being performed for the bits not corresponding to the scalar data value, on the registers specified by the scalar instruction, are written to the bits 64 to 127. For example, if the data values of registers F0 and F1 are added to give a result in register F3, the value of VSR3 in bits 64 to 127 might correspond as if a vector operation had been performed on the bits 64 to 127 of VSR0 and VSR1.

In another illustrative embodiment, the scalar value that is to be written to bits 0 to 63 may be replicated in bits 64 to 127. This approach may be beneficial, for example, when a scalar floating point value should later be combined with a vector value, e.g., when multiplying a vector by a scalar value. Normally the scalar value has to first be replicated across an entire register, such as with a "splat" instruction of the VMX or VSX instruction sets. This approach would eliminate the need for performing a "splat" instruction since the scalar value is already replicated.

In still another illustrative embodiment, the scalar value may be written to bits 0 to 63 of the register while whatever values that were present in bits 64 to 127 may remain unchanged. Such an approach may be used when a vector operation may need to be decomposed into a sequence of scalar operations, where each scalar result could be inserted into a specific vector element, ultimately creating a vector result from the multiple scalar results. This would be the lowest power embodiment since, when nothing needs to be written to the registers, nothing is written. However, it may lead to indeterminism, because the value present in the entire register may now be dependent on what value was resident in the register file prior to a scalar result being written. This is particularly problematic for architectures with register renaming, where the value present in the rename register is highly unpredictable.

In another illustrative embodiment, the scalar value may be written to bits 0 to 63 of the register while the remaining bits 64 to 127 may be filled with a default value, e.g., a zero. Such an approach may be used when a vector operation may need to be decomposed into a sequence of scalar operations, where the multiple scalar results are shifting and ORed together to form a vector result. This approach gives a predictable value, thus avoiding the problems associated with not writing anything. This option further represents lower load on the result bus than replicating the value (because that value does not have to be provided to 2 locations in the register which double the load).

For legacy vector, SIMD, or VMX instructions, the data values are read from/written to the entire range of bits 0 to 127 of the second set of VSRs [32] to [63]. For the new VSX instructions, data values are read from/written to the entire range of bits 0 to 127 of the entire set of VSRs [0] to [63]. With these VSX instructions, scalar values are written in the left side bits 0 to 63 of the registers while vector values are written across all of the bits 0 to 127.

Thus, with the mechanisms of the illustrative embodiments, when decoding instructions, there are really two characteristics of the instructions that need to be decoded. First is the width of the data access, i.e. the access width specification, and second is the register specifier. The access width specification identifies which bits of a register are to be read/written. The register specifier identifies which subset of registers, or the entire set of registers, in the multi-addressable register file that are to be read/written. The primary requirement for decoding the instruction is the register specifier which allows the multi-addressability aspect of overlaying the legacy smaller register files on top of the new vector-scalar register file to allow storage sharing.

Referring again to FIG. 4, as discussed above, decoding logic is added to an instruction decode unit 420 of a processor 400 for handling the three types of instructions using the single register file of the illustrative embodiments. The decoding logic determines the type of instruction and, based on the type of instruction, generates a width specifier for specifying the bit width of the registers in the register file 440 that may be accessed by the instruction. A full specifier for the entire register width is then generated based on the type of instruction and the width specifier and registers within a corresponding subset of registers 442-446 in the register file 440 are then addressed using the full specifier. Results of the operation are then computed based on the addressing of the subset of registers 442-446 using the full specifier with results of the operation being written back to the subset of registers 442-446 in the register file 440.

In accordance with one illustrative embodiment, there is provided an implementation of the Power Architecture (also known under the names of "PowerPC™" and "Power ISA™") including at least a first set of instructions of "Category: Floating-Point" (FPU, or legacy FPU), a second set of instructions of "Category: Vector" (VMX), and third set of instructions of "Category: VSX" in accordance with specifications set forth in Appendices to this Detailed Description of the Preferred Embodiments, which are hereby incorporated into this text by reference. Detailed information regarding floating point processor facilities is provided in Appendix A. Detailed information regarding a VMX processor facility is provided in Appendix C. Detailed information regarding a VSX processor facility is provided in Appendix D. In accordance with one illustrative embodiment, additional sets of instructions, such as of "Category: Decimal Floating-Point", may be present as detailed in Appendix B. Thus, for detailed information regarding each of these facilities, reference should be made to these appendices which are to be read in conjunction with the present Detailed Description of the Preferred Embodiments.

In accordance with one illustrative embodiment implementing the Power Architecture, the architected data format corresponding to instructions of "Category: Floating-Point" (FPU) (Appendix A) is IEEE 754 double precision floating point format as provided in the Power Architecture memory format, i.e., single precision load instructions convert single precision memory data to double precision representation, single precision store instruction convert floating point values to single precision format. Results generated with single precision instructions can serve as input directly to double precision instructions. Architecturally, the "Category: Floating-Point" instructions have been optimized for mixed precision computation and storage with respect to single and double precision floating point formats in the floating point register file. To optimize computations, and the conversion of single precision values into the double precision format, at least one implementation uses an internal format, e.g., having a representation of single precision denormalized numbers with an internally non-normalized format to avoid the cost of normalization during the loading and data conversion of a single precision floating point value, and potentially for other operations. However, this is hidden and not architecturally visible to any of the "Category: Floating-Point" instructions.

In accordance with one illustrative embodiment implementing the Power Architecture, the architected data format corresponding to instructions of "Category: VMX" (VMX) (Appendix C) is a memory image of data words having been read, and corresponding either to a vector of bytes, halfwords (2 bytes), words (4 bytes), or single precision floating point in accordance with IEEE single precision data layout. Memory access instructions do not provide any conversion between the memory format (with the possible exception of endian adjustment). This format is optimized for mixed integer/single precision floating point computation as often found in graphics computations, which represent one of the optimization targets of the VMX instruction category.

In accordance with one illustrative embodiment implementing the Power Architecture, the architected format of instructions of "Category: VSX" (VSX) (Appendix D) is a memory image of data words having been read, and adjusted to the data width of values to represent single elements in the leftmost bits, and entire vectors across the entire set of vector registers. In accordance with the definition of the VSX set of instructions, the architected data format corresponding to the set of VSX instructions is a word (4 bytes), a doubleword (8 bytes), or vectors thereof (16 byte, corresponding to vectors of 4 and 2 elements, of words and doublewords, respectively). The set of "Category: VSX" instructions is optimized for an increased register set, interoperability with the architected data formats of "Category: Floating-Point" and "Category: Vector" instructions, and consists of scalar and vector instructions for floating point and integer data types.

In at least one implementation, the "Category: Floating-Point" instructions are implemented to directly, without renormalizing data conversion, read both internal format generated by "Category: Floating-Point" instructions and memory format generated by "Category: VSX" instructions. In such an implementation, the "Category: Vector" instructions may be implemented to directly read either memory format or internal format generated by "Category: Floating-Point" instructions and memory format generated by "Category: VSX" instructions. In such an implementation, the double precision floating point instructions of "Category: VSX" instructions may be implemented to interoperate with "Category: Floating-Point" and directly, without renormalizing data conversion, read both internal format generated by "Category: Floating-Point" instructions and memory format generated by "Category: VSX" instructions. Integer and single precision instructions of "Category: VSX" instructions may be implemented to interoperate with "Category: Floating-Point" instructions by forcing renormalization when a number, in internal format, does not directly corresponding to a memory format (e.g., when the internal format contains a denormalized number for a value not in the double precision subnormal range).

In accordance with one illustrative embodiment, a register file includes an implicit bit for the leftmost double word in a register, and sets the implicit bit to correspond to the implicit bit of a double precision floating point value corresponding to the bit pattern loaded in said double word, regardless of data usage, when data in memory format is processed. In accordance with this illustrative embodiment, all instructions loading a value to a register set the implicit bit either to a value corresponding to an implicit bit of a floating point number in internal format, or to reflect "0" when the 11 bits 62 to 52 are zero, and "1" when these bits are non-zero.

In accordance with one illustrative embodiment, instructions of "Category: Vector" are not equipped to process numbers in internal format. In accordance with a multi-addressable register file, no data value generated by "Category: Floating-Point" instructions can be directly accessed by "Category: Vector" instructions. In accordance with this illustrative embodiment, any "Category: VSX" instruction that can make a data value generated by "Category: Floating-Point" instruction available as an input to "Category: VMX" instructions must renormalize data to correspond to memory format, when the internal format contains a denormalized number for a value not in the double precision subnormal range.

In accordance with another illustrative embodiment, instructions of "Category: Vector" are equipped to process numbers in internal format. While in accordance with a multi-addressable register file, no data value generated by "Category: Floating-Point" instructions can be directly accessed by "Category: Vector" instructions, in accordance with this embodiment, at least one VSX instruction can copy a number not directly corresponding to memory format without renormalization to a register directly accessible as input operand by an instruction of "Category: Vector", even when the internal format contains a denormalized number for a value not in the double precision subnormal range.

Figure 6:
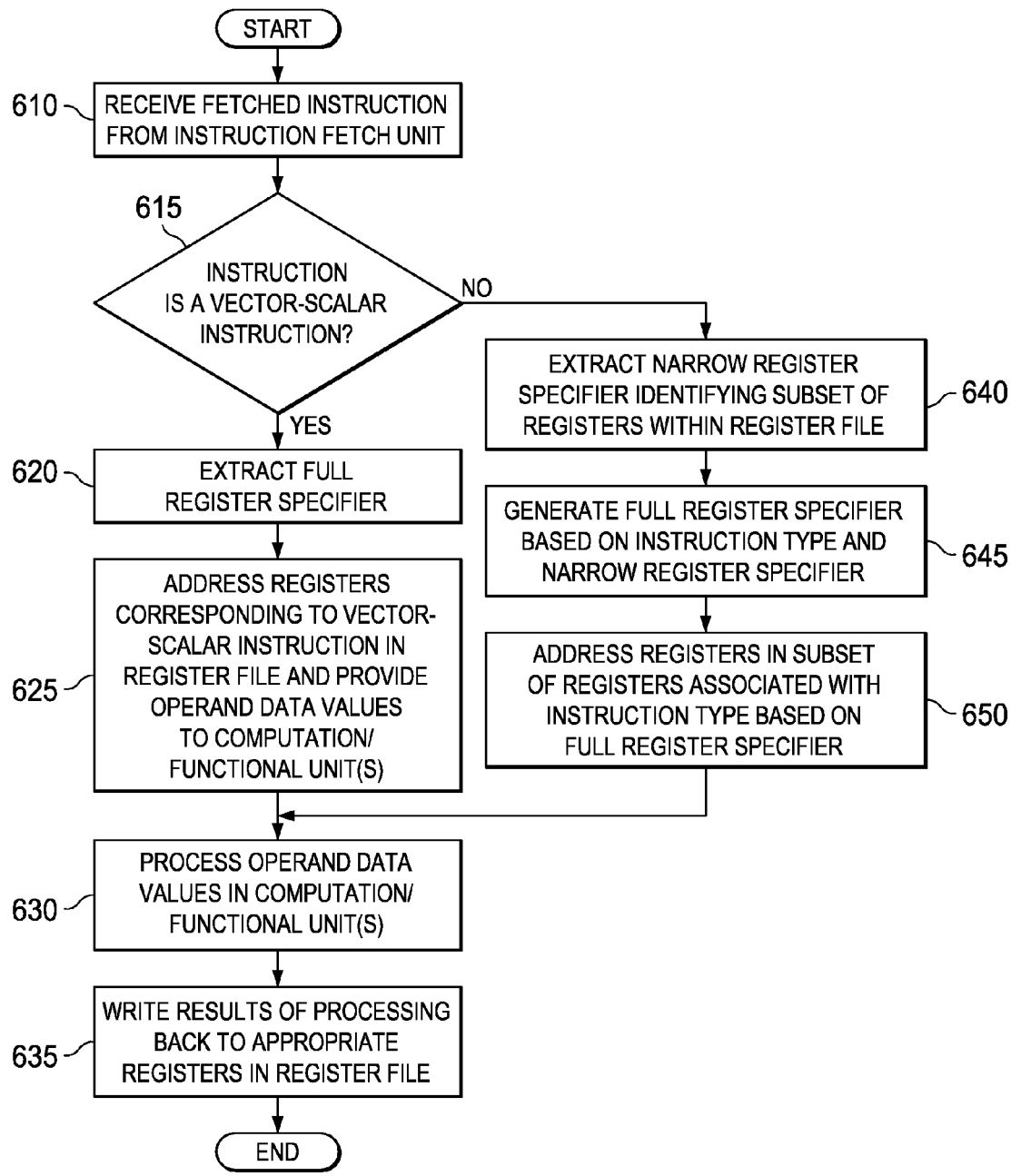
FIG. 6 is a flowchart outlining a general decode operation in accordance with one illustrative embodiment.
Figure 7A:
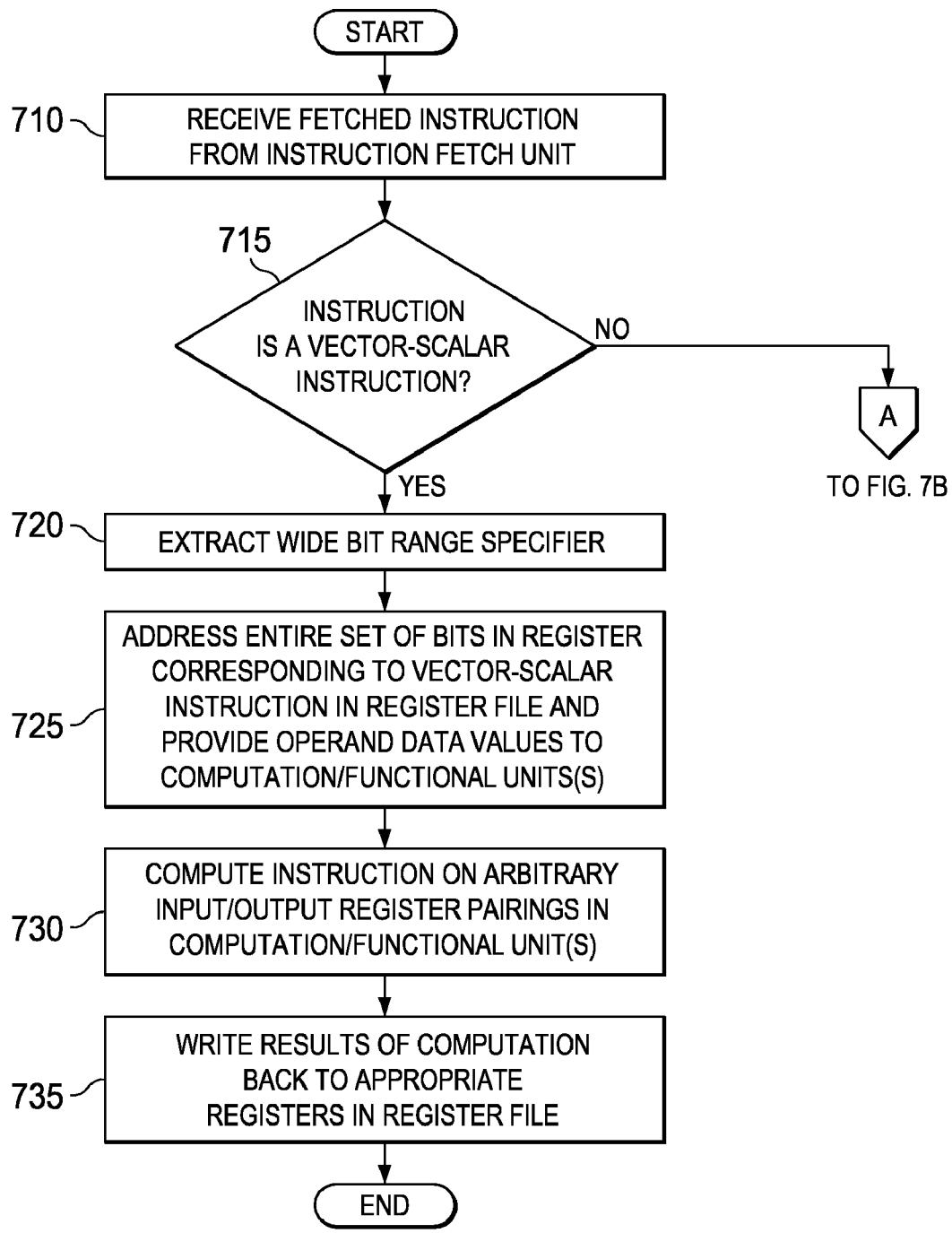
FIGS. 7A and 7B provide a flowchart outlining a first exemplary decode operation in accordance with one illustrative embodiment.
Figure 7B:
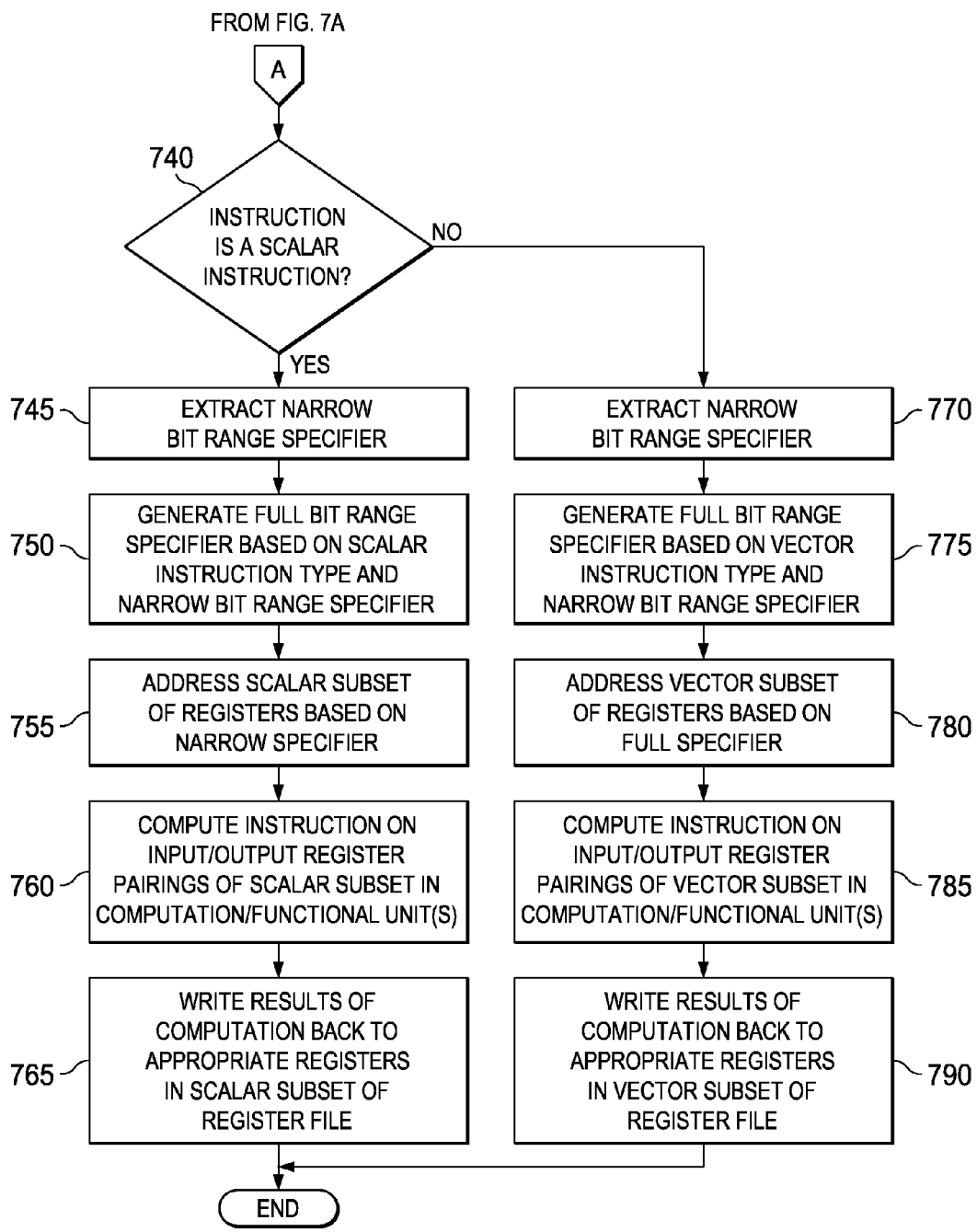

FIGS. 6-7B are flowcharts outlining exemplary decoding operations that may be implemented in the decode logic of the instruction decode unit of the illustrative embodiments. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

FIG. 6 is a flowchart outlining a general decode operation in accordance with one illustrative embodiment. As shown in FIG. 6, the operation starts with receiving a fetched instruction from an instruction fetch unit (step 610). Based on an opcode of the fetched instruction, the decode logic determines if the fetched instruction is a new type of instruction, e.g., a VSX instruction (step 615). If the opcode identifies the instruction to be a new type (e.g., VSX) instruction, a full register specifier is extracted from one or more fields in the instruction encoding (step 620). Instructions are specified by instruction words having several fields. These fields may include an opcode field, several register specifier fields, and a secondary opcode field, for example. When an instruction is encountered, the instruction decoder may determine what type of instruction is encountered (this is done by analyzing the opcode and secondary opcode field) which will also typically indicate what bits of a register to use (i.e., the subrange 520, 540, 560 to use.) The register specifier fields specify which register of 530, 550, or 570 to access. In one exemplary embodiment, each of the register specifier fields may provide a 5 bit specifier, i.e. a narrow specifier. Extension fields may be provided in the instruction word to provide an additional bit giving 6 bits to specify one of the 64 VSR registers of the register file.

Corresponding registers in the register file are addressed, i.e. selected, so as to provide their data values to appropriate computation or functional units for processing (step 625). That is, the full register specifier is provided to the register file, such that the register file knows which of the registers 570 to read or write. The register specifier is an "address" in a storage array that identifies a register.

The operand data values are processed by the computation/functional units (step 630) and results of the processing by the computation or functional units are then written back to the corresponding registers in the register file (step 635). The specific register to write back to is again specified by a register specifier.

If the opcode of the fetched instruction indicates that the instruction is not a VSX instruction (step 615), then a narrow register specifier is extracted that identifies a subset of registers, and possibly bits within the full width of a register, for use with the instruction (step 640). A full register specifier for the entire range of bits of the register is then generated based on the instruction type and the narrow bit range specifier (step 645). That is, one or more bits are added to the narrow register specifier to generate the full register specifier. The bits to be added depend on the subranges of the register file and how they were defined. For example, for legacy scalar instructions a 5-bit operand specifier, i.e. a narrow bit range specifier, is provided for each operand in the instruction encoding. A full register specifier may be generated, for example, by prepending a 0 to produce a 6-bit specifier, giving access to VSRs 0-31 in the depicted examples. For legacy scalar instructions, a 5-bit operand specifier, i.e. a narrow register specifier, is provided for each operand in the instruction encoding. A full register specifier may be generated, for example, by prepending a 1 to produce a 6-bit specifier, giving access to VSRs 32-63. For VSX instructions, a 6-bit operand specifier, i.e. a full bit range specifier, is provided for each operand in the instruction encoding and thus, no modification is needed to access all of the VSRs in the register file.

The narrow and full register specifiers of the illustrative embodiments allow for the "multi-addressable" nature of the register file which refers to the fact that different instructions in effect contain different addresses, and that the decoding adapts them, to overlay and use shared addressing of the register file. Thus, for example, a VSX register full register specifier with the 6 bits 000000 refers to VSX register 0. A legacy floating point instruction with a narrow register specifier of 5 bits 00000 refers to the same register, because it overlays the first 32 registers of VSR registers and is obtained by adding a "0" to the 5 bit narrow register specifer, giving 000000 in this specific example. On the other hand, a legacy VMX narrow register specifier of 5 bits 00000 refers to register 32 (the first register in the VSR32 to 63 range), and is obtained by adding a "1" to the 5 bit specifer, giving 100000 in the specific example.

Once the full register specifier is obtained, registers in a subset of registers associated with the instruction type identified by the opcode are addressed based on the full register specifier (step 650). A bit width may optionally be determined based on the instruction type such that a first set of bits of the register are associated with one instruction type, e.g., legacy scalar instructions, and another set of bits of the register are associated with another instruction type, e.g., legacy vector instructions. This functionality was described above and is optional to the particular implementation. Because it is optional, it is not explicitly shown in FIG. 6.

The operation then continues to step 630 where data values, e.g., operand values, from the addressed registers are provided to the computation/functional units for processing (step 630) and results are written back to the registers in the subset of registers (step 635) using the full register specifier. The operation then terminates.

FIGS. 7A and 7B depict a flowchart outlining a exemplary decode operation for one exemplary implementation in accordance with one illustrative embodiment. As shown in FIGS. 7A and 7B, the operation again starts with receiving a fetched instruction from an instruction fetch unit (step 710). Based on an opcode of the fetched instruction, the decode logic determines if the fetched instruction is a new type of instruction, e.g., a VSX instruction (step 715). If the opcode identifies the instruction to be a new type (e.g., VSX), a wide bit range specifier is extracted (step 720). A wide bit range specifier can address any of the registers 570, i.e., the full register file is addressed, as well as all bits in those registers (step 725). The corresponding register may be any register in the entire register file. The instruction is then computed using the data from the register with the computation being on arbitrary input and output register pairings (step 730). In other words, the VSX instructions operate on any of the registers in the register file and are not limited to a particular sub-range of registers. The results of the computation are then written back to an appropriate register in the register file (step 735).

If the opcode of the instruction indicates that the instruction is not a VSX instruction (step 715), then the decode logic determines if the instruction opcode identifies the instruction to be a scalar instruction, e.g., a floating point instruction or the like (step 740). If the instruction opcode identifies the instruction as a scalar instruction, then a narrow bit range specifier is extracted that identifies a subset of registers within the register file and optionally, a subset of bits within the registers of the subset of registers (step 745). A full bit range specifier is generated based on the instruction type and the narrow bit range specifier (step 750). Data is extracted from a subset of registers, e.g., the scalar subset of registers, associated with the instruction type specified by the opcode using the narrow bit range specifier (step 755). The data is provided to the computation/functional units which compute results based on input and output registers corresponding to the scalar subset of registers in the register file (step 760). The results of the computation are then written back to an appropriate register in the subset of registers for this instruction type, e.g., scalar register subset (step 765).

If the opcode of the instruction indicates that the instruction is not a scalar instruction (step 715), then a narrow bit range specifier is extracted that again identifies a subset of registers in the register file and optionally another subset of bits within these registers (step 770). A full bit range specifier is generated based on the instruction type, e.g., vector, SIMD, or VMX instruction, and the narrow bit range specifier (step 775). Data is extracted from a subset of registers, e.g., the vector subset of registers, associated with the instruction type specified by the opcode using the full bit range specifier (step 780). The data is provided to the computation/functional units which compute results based on input and output registers corresponding to the vector subset of registers in the register file (step 785). The results of the computation are then written back to an appropriate register in the subset of registers for this instruction type, e.g., vector register subset (step 790). The operation then terminates.

It can be seen from the above description that the illustrative embodiments provide a register file and decode methodology that permits three different types of addressing modes. In a first addressing mode, a non-contiguous encoding is used to select all operand registers from a full set of registers in the register file based on a first instruction type, e.g., VSX instruction type. In a second addressing mode, a contiguous encoding is used and a first range of addressable operand registers of the full set of registers in the register file is selected based on a second instruction type, e.g., a scalar instruction type. A register address is constructed for each of the operands such that all of the operands for the instruction are obtained from the first range of addressable operand registers.

In a third addressing mode, a contiguous encoding is also used and a second range of addressable operand registers is selected from the full set of registers in the register file based on a third instruction type, e.g., a vector instruction type. A register address is constructed for each of the operands such that the operands for the instruction are obtained from the second range of addressable operand registers. This second range of operand registers is preferably different from the first range of operand registers such that a register within the first range is not within the second range of operand registers.

The illustrative embodiments improve upon known systems and processor register file architectures and instruction decode methodologies by allowing a single register file to be used in processing legacy scalar, legacy vector, and new vector-scalar instructions. In this way, legacy scalar and vector instructions may be processed in addition to new vector-scalar instructions with data formats being compatible between the various instruction types. Moreover, since a single register file is being utilized, the overhead associated with switching between separate register files is avoided. Register sharing in accordance with the illustrative embodiments reduces the chip area of a register file and allows a unified register file to be utilized while maintaining legacy code without building separate legacy register files. The illustrative embodiments allow for data sharing between legacy and new instructions, i.e., a legacy instruction may write one of registers 530 or 550, and a new instruction, e.g., a VSX instruction, can combine values from any or all of registers 570. Depending on data formats, this data sharing mechanism is enabled efficiently with the additional data conversion invention following hereinbelow.

In addition to the above, the mechanisms of the illustrative embodiments provide functionality for performing dynamic data-driven conversion of data formats such that data may be stored and accessed by instructions using different representations, e.g., an internal representation and a memory representation. The mechanisms of the illustrative embodiments determine the data type of the operand being accessed as well as analyzes the data value subrange of the input operand data type. The operation first determines if the operand's data type matches the required format of the instruction being processed. If not, a determination is made as to whether a subrange of data values of the data type of the input operand is supported natively, i.e. without requiring a conversion operation, by the range of values for the required instruction format.

If the subrange of data values of the input operand format does not correspond to a range of values which can be processed without conversion by an instruction being processed, then a format conversion is performed on the data and the instruction may then operate on the data. Otherwise, if the subrange of data values of the input operand is supported natively by the instruction being processed, then the data may be operated on directly by the instruction without a format conversion operation and thus, the conversion is not performed.

Figure 8:
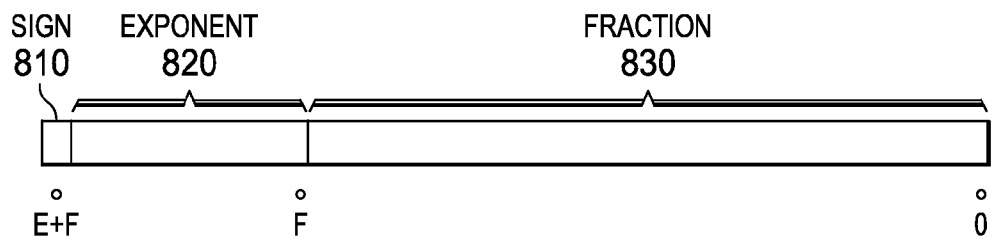
FIG. 8 is an exemplary diagram of a floating point data representation in accordance with IEEE standards.

To explain these mechanisms in greater detail, it is first desirable to explain how different data formats are used with different instruction types in modern computing devices. FIG. 8 is an exemplary diagram of a floating point data representation in accordance with IEEE 754 standards. As shown in FIG. 8, values are stored as data using a format having a sign bit 810, a plurality of exponent bits 820, and a plurality of fraction bits 830.

Values may be stored as normalized number or denormalized numbers. A normalized number is a non-zero number in a floating point representation which is within a balanced range supported by a given floating point format. The magnitude of the smallest normalized number in a format is given by $b^{emin}$, where b is the base (radix) of the format (usually 2 or 10) and emin depends on the size and layout of the format. Similarly, the magnitude of the largest normalized number in a format is given by $b^{emax} \times (b-b^{1-p})$ where p is the precision of the format in digits and emax is (−emin)+1. In the IEEE 754 standard binary and proposed decimal formats, p, emin, and emax have the following values:

| Format | P | emin | emax |
| --- | --- | --- | --- |
| Binary 32-bit | 24 | −126 | 127 |
| Binary 64-bit | 53 | −1022 | 1023 |
| Binary 128-bit | 113 | −16382 | 16383 |
| Decimal 32-bit | 7 | −95 | 96 |
| Decimal 64-bit | 16 | −383 | 384 |
| Decimal 128-bit | 34 | −6143 | 6144 |

For example, in the smallest decimal format, the range of positive normal numbers is $10^{-95}$ through $9.999999 \times 10^{96}$.

Non-zero numbers smaller in magnitude than the smallest normal number are called denormalized (or subnormal) numbers. Zero is neither normal nor denormal (subnormal). As implemented in the IEEE floating point standard binary formats, denormalized numbers are encoded with a biased exponent of 0, but are interpreted with the value of the smallest allowed exponent, which is one greater (i.e., as if it were encoded as a 1).

Figure 9A:
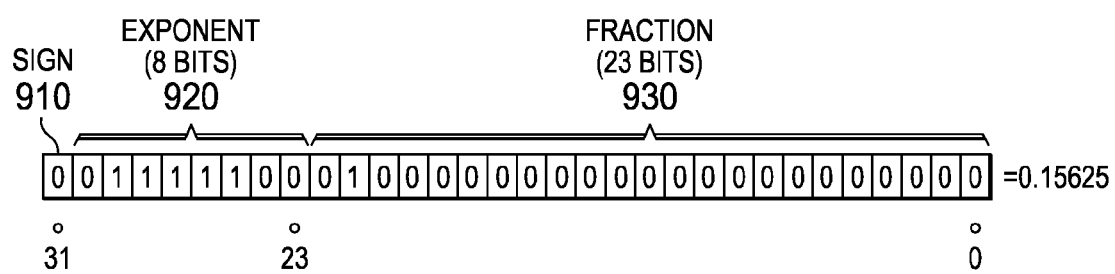
FIG. 9A is an exemplary diagram illustrating a single precision floating point data representation.

FIG. 9A is an exemplary diagram illustrating a single precision floating point data representation of a data value. As shown in FIG. 9A, in a single precision floating point data representation, the value is represented with a single sign bit 910, 8 exponent bits 920, and 23 fraction bits 930 for a total of 32 bits. The value (v) is defined by the expression $v=s \times 2e \times m$, where s=+1 (positive numbers) when the sign bit is 0 and s=−1 (negative numbers) when the sign bit is 1, e=Exp−127, i.e. the exponent is stored with 127 added to it, m=1.fraction in binary, i.e. the significand is the binary number 1 followed by the radix point followed by the binary bits of the fraction such that m is greater than or equal to 1 and less than 2. In the example shown in FIG. 9A, the sign bit 910 is 0, the exponent value is −3, and the significand is 1.01 (in binary, which is 1.25 in decimal). The represented number is thus, $+1.25 \times 2-3$, which is +0.15625. It should be noted that the example shown in FIG. 9A uses little endian representation whereas a similar result may be obtained using a big endian representation.

Figure 9B:
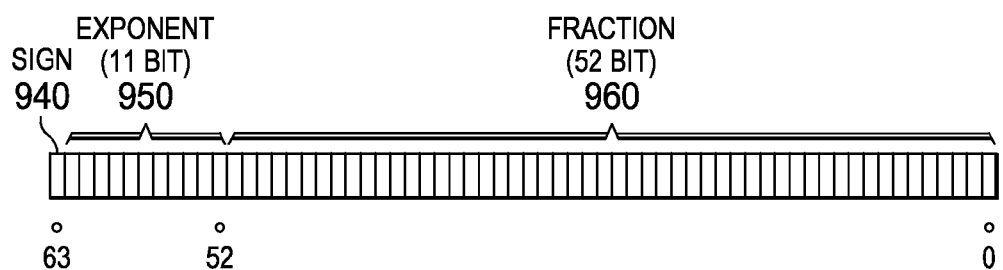
FIG. 9B is an exemplary diagram illustrating a double precision floating point data representation.

FIG. 9B is an exemplary diagram illustrating a double precision floating point data representation of a data value. As shown in FIG. 9B, in a double precision floating point data representation a single sign bit 940 is used with 11 bits of exponent data 950, and 52 fraction bits 960 for a total of 64 bits. Again, the value (v) is obtained with the expression $v=s \times 2e \times m$, where s=+1 (positive numbers) when the sign bit is 0 and s=−1 (negative numbers) when the sign bit is 1, and m=1.fraction in binary. However, with double precision, the exponent e=Exp−1023, i.e. the exponent is stored with 1023 added to it.

In some processor architectures, such as the POWER Architecture™ (also referred to as the "PowerPC" architecture or "Power ISA") available from International Business Machines Corporation of Armonk, N.Y., single precision numbers are automatically converted to double precision numbers. This conversion is performed using a simple expansion of the exponent and mantissa for normalized numbers. For single precision denormalized numbers, these numbers are represented as double precision normalized numbers subject to alignment shift to be properly formatted according to IEEE specifications. Such alignment shift operations are very expensive, in terms of processor cycles, in the load/store path of a processor.

There are two ways in which data values may be represented in a register file of a processor: memory representation and internal representation. The memory representation corresponds to the representations shown in FIGS. 9A and 9B. That is, in a memory representation, the data value comprises a sign bit, exponent bits, and fraction bits (also referred to as mantissa bits or simply the "mantissa"). In an exemplary internal representation, in accordance with one embodiment, the data value is comprised of a sign bit, an unused bit, exponent bits, an implied bit, mantissa bits, and parity bits. In the internal representation, the implicit bit, sometimes referred to as the "implied" bit, is the "1" that is dropped from the mantissa after normalization. The implied bit is 0 for denormalized numbers and an exponent of 0 is used to establish this special case in memory format.

When representing denormalized numbers, they can pose a problem with standard memory representation since the exponent must be analyzed to determine the implicit bit dropped from the mantissa after normalization. However, the exponent of the denormalized number is not "numerically contiguous," i.e. mathematically, for an exponent field that equals 0, the exponent is not "0—bias," but rather "1—bias." Therefore, an internal representation that stores the implicit bit, and optionally a "corrected" exponent, is preferred for denormalized numbers in order to make them numerically contiguous.

FIGS. 9C-1 and 9C-2 provide a diagram illustrating examples of a memory format and an internal format for various numbers using a single precision floating point data representation. FIGS. 9D-1 and 9D-2 provide a diagram illustrating examples of a memory format and an internal format for various numbers using a double precision floating point data representation. The memory representation provides the same data format as is expected by the architected registers and provides for simplified load and store operations because there is an exact correspondence to the bits to be stored in memory. Moreover, the memory representation simplifies bit-level operations. Bit-level operations are operations such as alignment operations, shifts, permute operations, logical operations wherein specific bits are set, etc., because they do not refer to a numeric value, but rather to a specific numbered bit as the value would be constituted in memory. Consider an attempt to change the value 100 to the value 500 with an instruction of "replace the first digit with 5." This would work on a normalized representation of 1*10^2 which becomes 5*10^2 but would fail utterly on a representation such as 0.01*10^4 which would yield 5.01*10^5=50100.

However, the internal representation simplifies floating point operations because the exponent is numerically contiguous and the implied bit is present so no decoding of the exponent field is necessary to determine what the implied bit value should be. Different instructions have natural affinities to operate on one data representation or the other. For example, integer operations and bit operations that operate on a memory layout are more efficient to implement when they receive data in memory format, because no reformatting is necessary. On the other hand, mathematical operations are easier with a numerically contiguous exponent and the implicit bit being stored in the register, because no data preconditioning has to be done to derive the implicit bit and make the exponent numerically contiguous for the purpose of computing the correct result.

Known mechanisms, such as the mechanism described in U.S. Pat. No. 6,105,129, have attempted to address the issue of different representations of data values by providing a complicated set of units that can operate on multiple data types. Such mechanisms either use a memory format everywhere and incur penalties for converting to and from the memory format even when the conversion is expensive, inefficient, and unnecessary or the known mechanisms tag each register as to whether the register corresponds to a floating point (internal representation) or integer (memory representation) data value such that when an instruction of one type accesses data of another type, an expensive conversion must again be performed. In either case, expensive conversion operations are required to allow instructions of one data type to access data of another data type.

A multi-addressable register file in accordance with the present invention might be operated in conjunction with a prior art data conversion system as described in U.S. Pat. No. 6,105,129. When operating a multi-addressable register file of the illustrative embodiments with support for data conversion in accordance with a mechanism such as taught in U.S. Pat. No. 6,105,129, each register may be tagged as to whether its value was generated by a floating point instruction (internal format), or a VMX or VSX instruction (memory format). Then, when an instruction of one type (e.g., VSX instruction requiring memory format) reads a value generated by an instruction of another type (e.g., floating point instruction generating internal format), a conversion step may be introduced, even in cases where such conversion is not necessary, because prior art data conversion for passing data between different instruction types is not data driven, but rather based on instruction types.

Thus, whenever data is shared from one instruction type to another instruction type with a different format, a conversion must be made in such an embodiment. Furthermore, in conjunction with prior art, a type field may be maintained with each register, specifying what the format type of the value contained in a register is.

Figure 10:
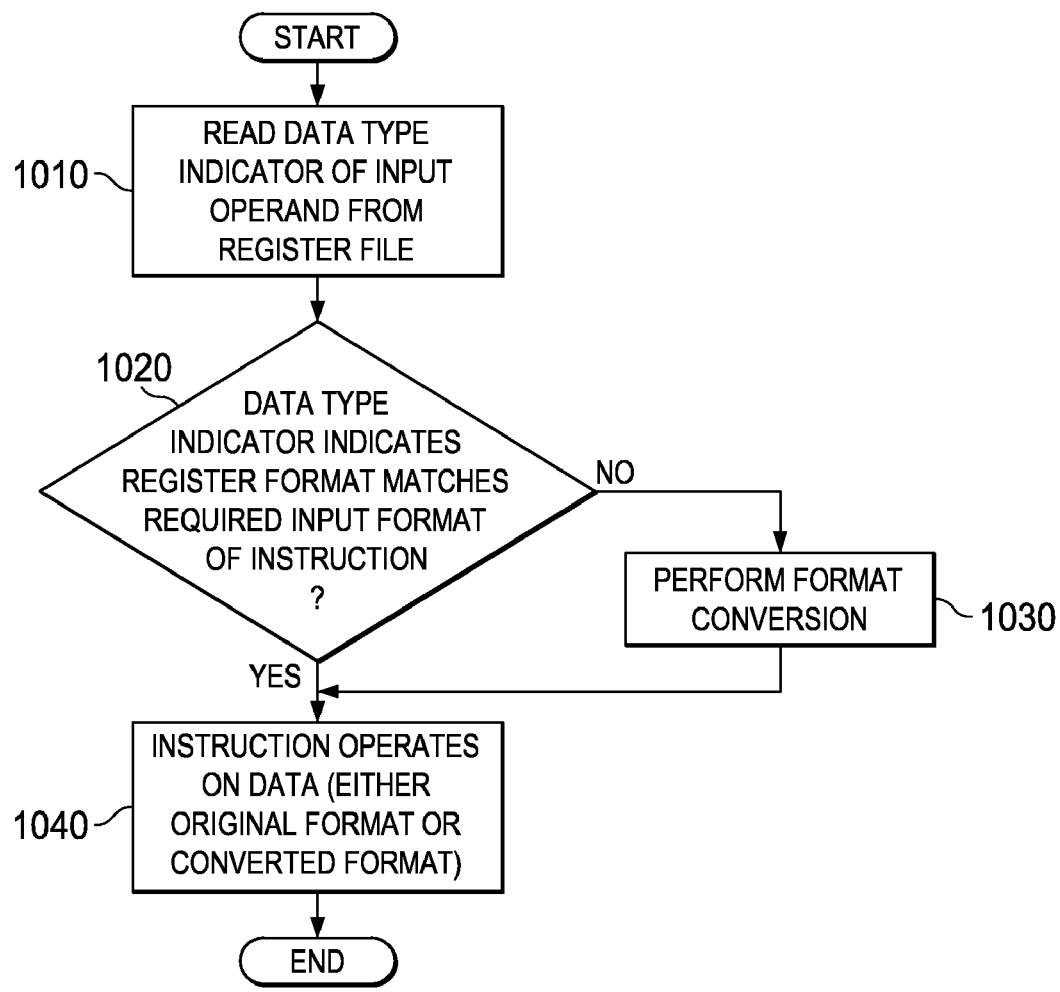
FIG. 10 is an exemplary flowchart outlining an example of a known non-data driven conversion operation performed by known processor architectures.

The known mechanisms typically predicate the conversion of the data types or formats based only on a "data type" field of an operand and a required format of an instruction. FIG. 10 is an exemplary flowchart outlining an example of a known non-data driven conversion operation performed by known processor architectures. As shown in FIG. 10, the known non-data driven conversion operation involves reading a data type indicator, which may be provided in a register format indicator associated with a register, of an input operand from the register file (step 1010). Based only on the data type indicator of the operand, as specified in a data type field of the operand, a determination is made as to whether the format associated with the register, as indicated by a register format indicator, matches the required input format of the instruction (step 1020). Every time that the operand has a data type that does not match the required format of the instruction, a format conversion is performed (step 1030). Thereafter, or if the data type of the operand matches the required format of the instruction, the data is operated on by the instruction (step 1040) and the operation terminates. What is important to note is that the determination as to whether to perform the format conversion is based on a comparison of the data type of the operand as stored in a required format indicator and the required format of the instruction. Furthermore, whenever a discrepancy between the input data format and the required format, results in a format conversion operation being performed.

In contrast, the present invention uses the storage bits of the register file without regard to a format indicator. Additional bits are stored in the register file and a memory format is directly derivable from the register file image for most data values. However, the memory format cannot be readily and efficiently derived for all internal format values. For example, consider a single precision number with a memory format 0x00000001. In this memory format, the exponent is 0b00000000 (numerically contiguous 0b00000001, mathematically 21-127), the sign is 0 (i.e., positive number), and the mantissa is $^{22}01$ (22 zeros followed by a single 1). This corresponds to a numerical value of 1.4012984643248171e-45. In the Power Architecture™, the single precision number is converted to a double precision format stored in the register file. The architected memory representation of this floating point number is 0x36a0000000000000. The exponent is 01101101010, the sign is 0, and the mantissa is 520. Numerically, this value also corresponds to 1.4012984643248171e-45. The internal representation for this number is exponent 01110000001, sign of 0, implicit bit of 0, and mantissa of 2201290 (22 zeros followed by a single 1, followed by 29 zeros). Numerically, this value also corresponds to 1.4012984643248171e-45.

However, direct derivation of a memory format from an internal format does not result in the correct memory image. That is, deriving a memory format from the internal format by eliminating the implicit bit for the referenced example results in a memory image corresponding to 0x3800000020000000 because the fact that implicit bit is 0 cannot be expressed other than for a denormalized number with a biased exponent value of 1 (by encoding said biased exponent value of 1 as an exponent field of 0, as per the IEEE 754 standard) and all other numbers must be normalized, i.e. have an implicit bit of 1. This leads to a corrupted representation which does not numerically correspond to 1.4012984643248171e-45. Thus, the example above shows a subrange that cannot be supported natively, i.e., the memory format cannot be derived directly out of the register file. Rather a conversion must be performed, which, in this case, requires normalizing the value.

In view of the above, it is desirable to be able to support both internal and memory representations of data values within a single processor register file due to the affinities of particular instructions to different formats. It is further desirable to be able to convert such representations or formats when necessary based on the particular format desired by an instruction being executed by the processor. Furthermore, it is beneficial to be able to perform such conversions of formats in a dynamic manner based on a dynamically data driven approach that takes into account not only the data type of the data upon which the instruction is operating and the required format of the instruction being executed, but also specific data ranges of the data values and whether such data ranges are natively supported by the logic, e.g., functional unit, implementing a specific instruction, i.e. the functional unit has logic to support the given type of input directly without a conversion being necessary. For example, if an instruction requiring a memory format input can be implemented cheaply to support certain forms of internal format, then that would be a "subrange" that would be supported "natively" by this functional unit executing the instruction.

The illustrative embodiments herein recognize that even though data types for the operands and the required formats for the instructions may differ, there are still instances where conversion of the format of the data is not necessary for proper execution of instructions and thus, the expensive overhead in performing such format conversions may be avoided. In order to avoid such blanket conversions whenever data types and required formats do not match, the illustrative embodiments not only look to the data type of the operand and the required format of the instruction, but also the data value subranges of the operand and whether the subrange of the data type of the operand is supported natively by the logic of the functional unit executing the instruction. If there is native support, then a conversion of formats, e.g., from memory representation to internal representation or vice versa, may be avoided. If there is not native support for the subrange of the data type of the operand, then a format conversion is performed.

As mentioned above, "native" support for an input operand format refers to a functional unit that executes an instruction being able to process the input operand format without having to perform a conversion operation on the data format. For example, general floating point representation, a denormalized number is any number that does not have a "1" as the first digit. In the IEEE memory format, all numbers are expected to be normalized, except for a small set of very small numbers represented with an exponent of 0 to create very small numbers.

However, in an internal format, any number can be represented in different ways. This is similar to writing the number 100 in these following ways: $0.01*10^4 = 0.1*10^3 = 1*10^2$ (etc.). Generally, it is agreed that a preferable way to write this number is $1*10^2$, i.e. scientific notation, but anybody skilled in mathematics will be able to handle all formats.

In the example, a test is made as to whether denormalized numbers, which could be represented as normalized numbers within the IEEE standard, are present. In this case, there is a requirement, to normalize the number and represent it in the IEEE-specified "memory" format which is normalized. Denormalized numbers which are not representable as normalized numbers are on the other hand kept as denormalized numbers. In particular, for the specific embodiment, this reformats numbers which may have been generated as denormalized double precision numbers corresponding to denormalized single precision numbers. However, when the data is processed as a double precision number, and a functional unit that executes an instruction is unable to handle this type of format, e.g., integer operations or data formatting and alignment operations, data conversion to the memory format must be performed. On the other hand, data processing the value as a double precision-formatted floating point input does not need data driven conversion because it is typically adapted to correctly process these values. Thus, some ranges of inputs of one format can be directly used in conjunction with another instruction type expecting a different input, while others cannot.

The illustrative embodiments add logic to the instruction decode unit, e.g., instruction decode unit 420 in FIG. 4, to perform operations for sharing data in internal and memory representations with dynamic data driven conversion. The logic preferably implements a methodology as set forth in FIG. 11 hereafter. This methodology determines when format conversions of data are necessary based on not only the data type field of an operand read from the register file, but also based on analysis of the actual data value ranges of the data upon which the instruction is to be executed.

Figure 11:
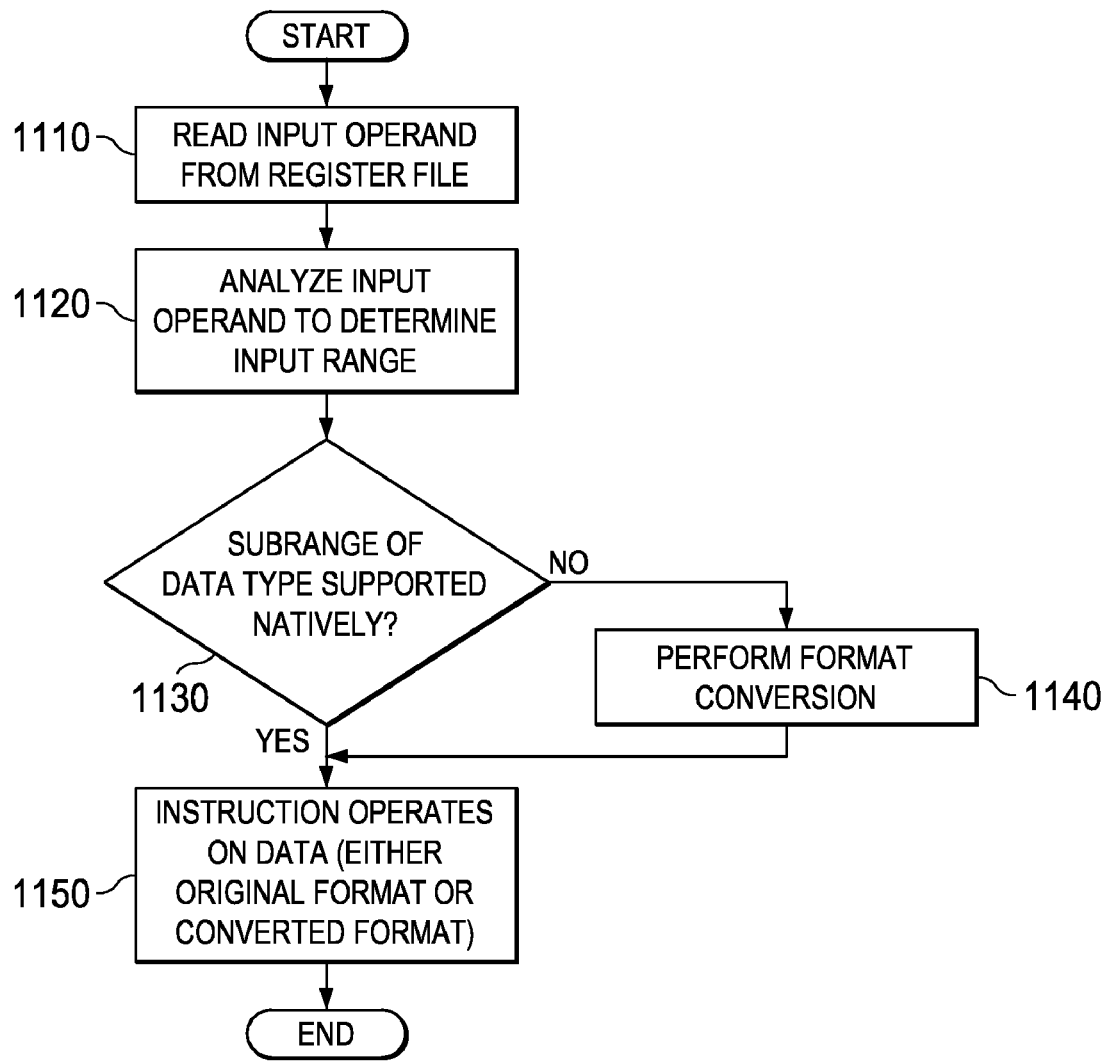
FIG. 11 is a flowchart outlining an exemplary operation for performing data driven format conversion of data for execution of instructions in a processor in accordance with one illustrative embodiment.

FIG. 11 is a flowchart outlining an exemplary operation for performing data driven format conversion of data for execution of instructions in a processor in accordance with one illustrative embodiment. As shown in FIG. 11, the operation starts by reading an input operand, for an instruction fetched by the instruction fetch unit, from the register file (step 1110). The input operand is analyzed by operand analysis logic in the instruction decode unit to identify the actual data value ranges of the data (step 1120). Based on the data range and the current instruction, the control logic of the instruction decode unit determines if the data inputs of the fetched instruction have a required data range supported natively (step 1130).

If the data range of the data is not supported natively, i.e. the input data cannot be handled by the functional unit executing the instruction without a data format conversion, then a data format conversion operation is performed by the decode unit logic (step 1140).

Thereafter, if the instruction inputs have a required format that matches the data type of the data, or if the data range of the data is supported natively, the instruction is then permitted to operate on the data (step 1150). The data driven format conversion operation then terminates.

Figure 12:
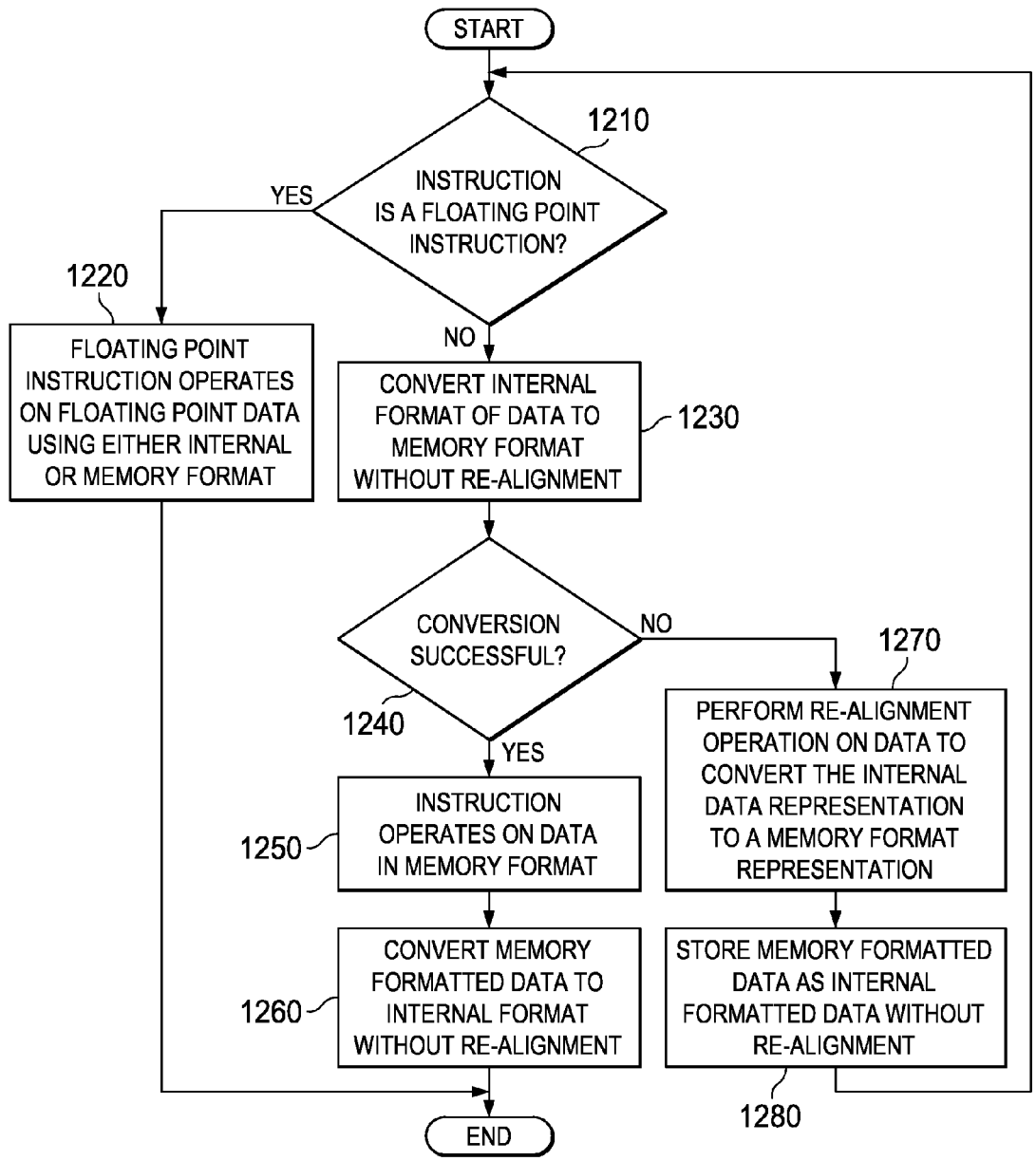
FIG. 12 is a flowchart that outlines and operation for performing data conversion in accordance with one illustrative embodiment.

FIG. 12 is a flowchart that outlines and operation for performing data conversion in accordance with one illustrative embodiment. The operation outlined in FIG. 12 may be implemented in logic of the instruction decode unit, for example, As shown in FIG. 12, the operation starts by determining if the instruction is a floating point instruction (step 1210). If the operation is a floating point instruction, then the floating point instruction operates on floating point data using either an internal (such as for denormalized values) or a memory format (such as for normalized values) (step 1220). The operation of the instruction on the data is performed in a functional unit, such as a floating point execution unit or the like.

If the instruction is not a floating point instruction, an internal format of the data is converted to a memory format without performing realignment of the data (step 1230). A determination is made as to whether the conversion from the internal format to the memory format is performed successfully (step 1240). This determination essentially means that the conversion is able to be performed without going through re-alignment, i.e. normalization. If the values correspond to values that do not need normalization with shift logic, then this is "successful". If the conversion is performed successfully, then the instruction is permitted to operate on the data in a memory format (step 1250). The memory formatted data is then converted to an internal format without performing a realignment operation (step 1260).

If the conversion from internal format to memory format without the realignment is not performed successfully (step 1240), a realignment operation is performed on the data to convert the internal data representation to a memory format representation of the data (step 1270). The memory formatted data is then stored as the internal formatted data but does not require realignment for conversion (step 1280). The operation then returns to step 1210 and the operation repeats.

Thus, the present invention dynamically determines if a conversion operation is necessary or not in a data-driven manner. The illustrative embodiments allow efficient interoperation of operations using different internal representations by using data-driven conversion to perform conversion only when necessary based on specific data value ranges encountered. Thus, whether or not to convert from one format to another format is not simply a determination based on a "data type" field of an input operand.

Such functionality is especially useful in mixed mode architectures such as that described previously with regard to the multi-addressable register file. That is, data of various data types may be stored in the same register file and may be accessed by various types of instructions, e.g., floating point, integer, VMX, and VSX instructions, which may require different data formats. Thus, data may be stored in one format in the multi-addressable register file while and may be accessed by instructions requiring a different format. As one example, internal format floating point data can become an input to a VSX instruction which requires a memory format.

When executing such instructions, it is desirable to avoid overhead penalties of format conversions when possible. The mechanisms and methodology for dynamic data driven format conversion discussed above may be used to minimize such overhead by determining if format conversions are actually necessary based on the data type of data and the actual data value ranges. Only when the data type does not match the format required by the executing instruction and the data value range is not natively supported will a format conversion operation be performed. If the data type matches the format required by the executing instruction or the data type does not match the format required by the executing instruction but the data value range is natively supported, then the instruction operates on the data without a format conversion operation being performed. This greatly reduces the number of format conversions necessary and thus, the overhead expenditures, in terms of processor cycles, required to execute instructions requiring one data format on data that is in another data format.

It should be appreciated that the illustrative embodiments may take the form of a specialized hardware embodiment, a software embodiment that is executed on a computer system having general processing hardware, or an embodiment containing both specialized hardware and software elements that are executed on a computer system having general processing hardware. In one exemplary embodiment, the mechanisms of the illustrative embodiments are implemented in a software product, which may include but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, or semiconductor system, apparatus, or device. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read-only memory (CD-ROM), compact disk-read/write (CD-R/W) and DVD.

The program code of the computer program product may comprise instructions that are stored in a computer readable storage medium in a client or server data processing system. In a client data processing system embodiment, the instructions may have been downloaded over a network from one or more remote data processing systems, such as a server data processing system, a client data processing system, or a plurality of client data processing systems using a peer-to-peer communication methodology. In a server data processing system embodiment, the instructions may be configured for download, or actually downloaded, over a network to a remote data processing system, e.g., a client data processing system, for use in a computer readable storage medium with the remote data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for processing an instruction, comprising:

determining an original data format of input data upon which the instruction is to operate;

determining if a required data format of the instruction does not match the original data format;

in response to the required data format of the instruction not matching the original data format, determining if a data value range of the data is natively supported by logic executing the instruction;

performing a data format conversion in response to the data value range of the data not being natively supported to convert the original data format to the required data format thereby generating data having a converted data format; and executing the instruction on the data having the converted data format if the data value range of the data is not natively supported.

2. The method of claim 1, further comprising:
executing the instruction on data having the original data format if the data value range of the data is natively supported.

3. The method of claim 1, wherein performing the data format conversion comprises:
determining if the instruction is a floating point instruction; and
if the instruction is a floating point instruction, not performing the data format conversion.

4. The method of claim 3, further comprising:
converting the original data format to a memory format without normalization to generate memory formatted data; and
executing the instruction on the memory formatted data.

5. The method of claim 4, wherein executing the instruction on the memory formatted data is performed only if the conversion of the original data format to the memory format is performed successfully without normalization.

6. The method of claim 4, further comprising:
converting the memory formatted data to internal formatted data without normalization following execution of the instruction on the memory formatted data.

7. The method of claim 4, further comprising:
determining if converting the original data format to the memory format without normalization is performed successfully; and
performing normalization of the original data format in response to a determination that the conversion was not performed successfully to thereby generate normalized memory formatted data.

8. The method of claim 7, further comprising:
storing the normalized memory formatted data as original formatted data; and
repeating the converting operation and determining operation based on the normalized memory formatted data being stored as original formatted data.

9. The method of claim 7, wherein performing normalization of the original data format in response to a determination that the conversion was not performed successfully to thereby generate normalized memory formatted data occurs in response to the input data having been generated by a legacy floating point arithmetic instruction and the instruction that is to operate on the input data being a vector scalar extension (VSX) instruction not adapted to process input data in an internal format.

10. The method of claim 1, wherein the method is implemented using a mixed mode processor architecture in which data of different data types are stored in a unified register file.

11. The method of claim 1, wherein the method is implemented using a multi-addressable register file comprising a first subset of registers associated with first instructions of a first instruction type and a second subset of registers associated with second instructions of a second instruction type, and wherein third instructions of a third instruction type access registers in an entire set of registers of the multi-addressable register file including registers in the first subset of registers and registers in the second subset of registers.

12. The method of claim 1, wherein determining if a required data format of the instruction does not match the original data format is performed based on processing of the input data from a register file in one of internal format or memory format with both legacy floating point instructions and floating point vector-scalar extension (VSX) instructions, and processing the input data in a memory format with VSX and vector multimedia extension (VMX) integer instructions, when the register file is adapted to store at least legacy floating point, VMX, and VSX operands in the register file.

13. The method of claim 1, wherein the converted data format is an internal format if the instruction is a legacy floating point instruction and is a memory format if the instruction is a vector multimedia extension (VMX) instruction or a vector-scalar extension (VSX) instruction.

14. An apparatus, comprising:
an instruction decode unit;
a register file coupled to the instruction decode unit; and
one or more functional units coupled to the register file, wherein the instruction decode unit:
determines an original data format of input data, read from the register file, upon which the instruction is to operate;
determines if a required data format of the instruction does not match the original data format;
in response to the required data format of the instruction not matching the original data format, determines if a data value range of the data is natively supported by logic executing the instruction; and
performs a data format conversion in response to the data value range of the data not being natively supported to convert the original data format to the required data format thereby generating data having a converted data format, and wherein the one or more functional units execute the instruction on the data having the converted data format if the data value range of the data is not natively supported.

15. The apparatus of claim 14, wherein the one or more functional units execute the instruction on data having the original data format if the data value range of the data is natively supported.

16. The apparatus of claim 14, wherein the instruction decode unit performs the data format conversion by:
determining if the instruction is a floating point instruction; and
if the instruction is a floating point instruction, not performing the data format conversion.

17. The apparatus of claim 16, wherein the instruction decode unit further performs the data format conversion by converting the original data format to a memory format without normalization to generate memory formatted data, and wherein the one or more functional units execute the instruction on the memory formatted data.

18. The apparatus of claim 17, wherein the one or more functional units execute the instruction on the memory formatted data only if the conversion of the original data format to the memory format is performed successfully without normalization.

19. The apparatus of claim 17, wherein the instruction decode unit further converts the memory formatted data to internal formatted data without normalization following execution of the instruction on the memory formatted data.

20. The apparatus of claim 17, wherein the instruction decode unit further performs data format conversion by:
determining if converting the original data format to the memory format without normalization is performed successfully; and
performing normalization of the original data format in response to a determination that the conversion was not performed successfully to thereby generate normalized memory formatted data.

21. The apparatus of claim 20, wherein the instruction decode unit further performs data format conversion by:
storing the normalized memory formatted data as original formatted data; and repeating the converting operation and determining operation based on the normalized memory formatted data being stored as original formatted data.

22. The apparatus of claim 14, wherein the apparatus has a mixed mode processor architecture in which data of different data types are stored in the register file.

23. The apparatus of claim 14, wherein the register file is a multi-addressable register file comprising a first subset of registers associated with first instructions of a first instruction type and a second subset of registers associated with second instructions of a second instruction type, and wherein third instructions of a third instruction type access registers in an entire set of registers of the multi-addressable register file including registers in the first subset of registers and registers in the second subset of registers.

24. A computer program product comprising a computer readable storage medium having a computer readable program recorded stored thereon, wherein the computer readable program, when executed on a computing device, causes the computing device to:

determine an original data format of input data upon which an instruction is to operate;

determine if a required data format of the instruction does not match the original data format;

in response to the required data format of the instruction not matching the original data format, determine if a data value range of the data is natively supported by logic executing the instruction;

perform a data format conversion in response to the data value range of the data not being natively supported to convert the original data format to the required data format thereby generating data having a converted data format; and execute the instruction on the data having the converted data format if the data value range of the data is not natively supported.

* * * * *